US011305261B2

(12) United States Patent
Dasanayake Aluthge et al.

(10) Patent No.: US 11,305,261 B2
(45) Date of Patent: Apr. 19, 2022

(54) CATALYST, CARBON DIOXIDE REDUCING METHOD, AND APPARATUS FOR REDUCING CARBON DIOXIDE

(71) Applicant: SEKISUI CHEMICAL CO., LTD., Osaka (JP)

(72) Inventors: Rasika Dasanayake Aluthge, Tokyo (JP); Kenichi Shinmei, Tsukuba (JP); Noritoshi Yagihashi, Tsukuba (JP); Haruka Nishiyama, Nagareyama (JP); Taiyou Mori, Sakado (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 16/970,440

(22) PCT Filed: May 29, 2019

(86) PCT No.: PCT/JP2019/021439
§ 371 (c)(1),
(2) Date: Aug. 17, 2020

(87) PCT Pub. No.: WO2019/230855
PCT Pub. Date: Dec. 5, 2019

(65) Prior Publication Data
US 2021/0114004 A1    Apr. 22, 2021

(30) Foreign Application Priority Data

May 29, 2018  (JP) .............................. JP2018-102695
Sep. 14, 2018 (JP) .............................. JP2018-173100
Sep. 21, 2018 (JP) .............................. JP2018-177052
Mar. 19, 2019 (JP) .............................. JP2019-051804
Mar. 19, 2019 (JP) .............................. JP2019-051814

(51) Int. Cl.
| *B01J 21/06*  | (2006.01) |
| *B01J 21/08*  | (2006.01) |
| *B01J 21/10*  | (2006.01) |
| *B01J 23/06*  | (2006.01) |
| *B01J 23/745* | (2006.01) |
| *B01J 23/83*  | (2006.01) |
| *B01J 23/89*  | (2006.01) |
| *B01J 37/02*  | (2006.01) |
| *B01J 37/08*  | (2006.01) |
| *B01D 53/86*  | (2006.01) |

(52) U.S. Cl.
CPC ...... *B01J 23/8906* (2013.01); *B01D 53/8671* (2013.01); *B01J 21/063* (2013.01); *B01J 21/066* (2013.01); *B01J 21/08* (2013.01); *B01J 21/10* (2013.01); *B01J 23/06* (2013.01); *B01J 23/745* (2013.01); *B01J 23/83* (2013.01); *B01J 37/0221* (2013.01); *B01J 37/0228* (2013.01); *B01J 37/0236* (2013.01); *B01J 37/0244* (2013.01); *B01J 37/088* (2013.01); *B01D 2255/1023* (2013.01); *B01D 2255/2065* (2013.01); *B01D 2255/20738* (2013.01); *B01D 2257/504* (2013.01)

(58) Field of Classification Search
CPC ........ B01D 53/62; B01D 53/74; B01D 53/81; B01D 53/8681; B01D 2251/40; B01D 2255/10; B01D 2255/207; B01D 2255/20738; B01D 2255/204; B01D 2257/504; B01D 2258/0283; B01J 8/00; B01J 19/1837; B01J 19/2455; B01J 23/02; B01J 23/40; B01J 23/70; B01J 23/8906; B01J 23/8946; B01J 2208/00; Y02C 20/40; Y02E 20/32
See application file for complete search history.

(56) References Cited

U.S. PATENT DOCUMENTS

| 5,911,964    | A   |   | 6/1999 | Iwanami et al. |           |
| 9,381,491    | B2  | * | 7/2016 | Yang ......................  | B01D 53/62 |
| 2011/0024687 | A1  |   | 2/2011 | White et al.   |           |
| 2013/0167840 | A1  | * | 7/2013 | Monzyk ................... | B01J 20/06 |
|              |     |   |        |                | 128/202.26 |

(Continued)

FOREIGN PATENT DOCUMENTS

| CN | 103394356 | 11/2013 |
| CN | 105498798 | 4/2016  |

(Continued)

OTHER PUBLICATIONS

International Search Report dated Aug. 6, 2019 in corresponding International (PCT) Application No. PCT/JP2019/021439.
Takashi Suzuki, et al., "The Selective Reverse Water Gas Shift Reaction on $MoO_3/ZnO$ Catalyst—An Attempt for the Rationalized Production of an Oxogas in the Steam Reforming Process with Cofeeding $CO_2$-", Journal of the Japan Institute of Energy, non-official translation ("1. Introduction", "2.1 Catalysts", "2.2 Hydrogen reduction treatment and reverse shift reaction", "3.2 Reverse shift reaction using a $MoO_3/ZnO$ Catalyst"), vol. 74, pp. 806-812, 1995.

(Continued)

*Primary Examiner* — Timothy C Vanoy
(74) *Attorney, Agent, or Firm* — Wenderoth, Lind & Ponack, L.L.P.

(57) ABSTRACT

A catalyst of the present invention contains a first transition metal oxide (A1) represented by the general formula $M^1O_x$, wherein $M^1$ represents a transition metal element, and x represents a positive real number, and a metal compound (B1) capable of adsorbing carbon dioxide. The first transition metal oxide (A1) is supported on the metal compound (B1), and the first transition metal oxide (A1) can produce a compound represented by the general formula $M^1O_{x-n}$ by reduction, wherein $M^1$ and x are as defined above, and n represents a positive real number equal to or less than x.

47 Claims, 1 Drawing Sheet

(56) References Cited

U.S. PATENT DOCUMENTS

| | | | | |
|---|---|---|---|---|
| 2013/0294991 A1* | 11/2013 | Jones | ................... | B01J 20/327 423/228 |
| 2014/0121433 A1 | 5/2014 | Cizeron et al. | | |
| 2015/0157979 A1* | 6/2015 | Park | ...................... | C01B 3/105 423/231 |
| 2017/0144104 A1* | 5/2017 | Balfe | ................... | B01D 45/12 |
| 2021/0146302 A1* | 5/2021 | Materic | ................... | C01B 32/60 |

FOREIGN PATENT DOCUMENTS

| | | |
|---|---|---|
| CN | 106492778 | 3/2017 |
| DE | 44 22 227 | 1/1995 |
| GB | 2 279 583 | 1/1995 |
| JP | 63-119851 | 5/1988 |
| JP | 4-349937 | 12/1992 |
| JP | 6-279012 | 10/1994 |
| JP | 2010-525118 | 7/2010 |
| JP | 2011-158243 | 8/2011 |
| JP | 2015-522407 | 8/2015 |
| JP | 2018-79418 | 5/2018 |

OTHER PUBLICATIONS

Bo Feng et al., "Screening of $CO_2$ Adsorbing Materials for Zero Emission Power Generation Systems", Energy & Fuels, vol. 21, pp. 426-434, Jun. 1, 2007.

Wu Qin et al., "Theoretical study of oxidation-reduction reaction of $Fe_2O_3$ supported on MgO during chemical looping combustion", Applied Surface Science, vol. 266, pp. 350-354, Dec. 13, 2012.

Vladimir V. Galvita et al., "$CeO_{2\text{-}Modified\ Fe_2O_3}$ for $CO_2$ Utilization via Chemical Looping", Ind. Eng. Chem. Res. (I&EC research), vol. 52, pp. 8416-8426, 2013.

Yolanda A. Daza et al., "Isothermal reverse water gas shit chemical looping on $La_{0.75}Sr_{0.25}Co_{(1-Y)}Fe_YO_3$ perovskite-type oxides", Catalysis Today, vol. 258, pp. 691-698, 2015.

Mohammad Ismail et al., The performance of Fe2O3-CaO Oxgen Carriers and the Interaction of Iron Oxides with CaO during Chemical Looping Combustion and H2 production:, Energy Procedia, 2014, vol. 63, pp. 87-97.

Peng Zheng et al., "Silica encapsulated heterostructure catalyst of Pt nanoclusters on hematite nanocubes: synthesis and reactivity", Journal of Materials Chemistry, Jan. 22, 2010, vol. 20, pp. 2013-2017.

Marcus Wenzel et al., "Continuous production of CO from CO2 by RWGS chemical looping in fixed and fluidized bed reactors", Chemical Engineering Journal, Dec. 8, 2017, vol. 336, pp. 278-296.

International Search Report dated Aug. 6, 2019 in International (PCT) Application No. PCT/JP2019/021437.

International Search Report dated Aug. 6, 2019 in International (PCT) Application No. PCT/JP2019/021438.

Extended European Search Report dated Jan. 31, 2022 in corresponding European Patent Application No. 19811341.7.

\* cited by examiner

CATALYST, CARBON DIOXIDE REDUCING METHOD, AND APPARATUS FOR REDUCING CARBON DIOXIDE

TECHNICAL FIELD

The present invention relates to, for example, a catalyst for use in chemical looping and the like, a carbon dioxide reducing method using the catalyst, and an apparatus for reducing carbon dioxide having the catalyst.

BACKGROUND ART

A large amount of carbon dioxide discharged from power generation facilities, incineration facilities, steel manufacturing facilities, and the like is known as greenhouse effect gas responsible for resulting in global warming, and thus, reduction thereof is desired. For this reason, conventionally, fixation or reduction of carbon dioxide has been often attempted. As a method for reducing carbon dioxide, a reverse shift reaction is known in which carbon monoxide and water are formed from carbon dioxide and hydrogen.

Additionally, in recent years, chemical looping has been contemplated to be utilized for reduction of carbon dioxide. Chemical looping is an approach in which, for example, the reverse shift reaction described above is divided and carried out in a catalyst reduction reaction of oxidizing hydrogen to water to reduce a metal oxide catalyst (first process) and a carbon dioxide reduction reaction of reducing carbon dioxide to carbon monoxide by the reduced metal oxide catalyst (second process) as well as the metal oxide catalyst is used in circulation (looping) between the first and second processes.

As a metal oxide catalyst for use in chemical looping, a transition metal oxide such as iron oxide has been contemplated as one of potent candidates. Iron oxide alone is likely to be deactivated and unlikely to enhance the reduction ratio of carbon dioxide. Thus, for example, in NPL 1, it is contemplated that chemical looping is carried out using a mixture of iron oxide and cerium oxide ($CeO_2$—$Fe_2O_3$) as a catalyst. It is also known that a metal oxidation catalyst is doped with various metal species such as Sr and Co. Specifically, NPL 2 discloses a perovskite-type one such as $La_{0.75}Sr_{0.25}Co_{(1-\gamma)}Fe_\gamma O_3$, wherein $\gamma=0$, 0.5, 0.75, and 1.

CITATION LIST

Non Patent Literature

NPL1: Ind. Eng. Chem. Res. 2013, 52, pp. 8416-8426
NPL2: Catalysis Today 258 (2015), pp. 691-698

SUMMRY OF INVENTION

Technical Problem

Incidentally, in reduction reactions including reduction of carbon dioxide utilizing chemical looping as described above, it is desired to lower the reaction temperature as much as possible. However, for example, in NPL 1, although the amount of carbon monoxide produced is large, but a high temperature is required for the reaction. As in NPL 2, when $La_{0.75}Sr_{0.25}Co_{(1-\gamma)}Fe_\gamma O_3$ is used as the catalyst, the amount of carbon monoxide to be produced is small.

Thus, it is an object of the present invention to provide a catalyst capable of making the reduction ratio of carbon dioxide higher even when a reduction reaction is carried out at a relatively low temperature.

Solution to Problem

The present inventors have intensively studied to have found that causing a metal compound capable of absorbing carbon dioxide to support a specific transition metal oxide in a catalyst can solve the problem described above, having completed the present invention. That is, the present invention provides the following [1] to [19].

[1] A catalyst comprising:
a first transition metal oxide (A1) represented by the general formula $M^1O_x$, wherein $M^1$ represents a transition metal element, and x represents a positive real number; and
a metal compound (B1) capable of adsorbing carbon dioxide, wherein
the first transition metal oxide (A1) is supported on the metal compound (B1), and
the first transition metal oxide (A1) can produce a compound represented by the general formula $M^1O_{x-n}$ by reduction, wherein $M^1$ and x are as defined above, and n represents a positive real number equal to or less than x.

[2] The catalyst according to [1], wherein the transition metal element represented by $M^1$ is at least one selected from the group consisting of iron, titanium, molybdenum, yttrium, chromium, lanthanum, and niobium.

[3] The catalyst according to [1] or [2], further comprising a second transition metal oxide (A2) represented by the general formula $M^2O_y$, wherein $M^2$ is a transition metal element different from $M^1$, and y is a positive real number, wherein the second transition metal oxide (A2) is supported on the metal compound (B1).

[4] The catalyst according to [3], wherein the transition metal element represented by $M^2$ is cerium.

[5] The catalyst according to [3] or [4], wherein the transition metal element represented by $M^1$ is iron, and the transition metal element represented by $M^2$ is cerium.

[6] The catalyst according to any one of [3] to [5], wherein a mass ratio of the second transition metal element represented by $M^2$ to the first transition metal element represented by $M^1$ (second transition metal element/first transition metal element) is 5/95 or more and 80/20 or less.

[7] The catalyst according to any one of [1] to [6], wherein the metal element constituting the metal compound (B1) is at least one metal selected from the group consisting of beryllium, magnesium, calcium, strontium, barium, and zinc.

[8] The catalyst according to any one of [1] to [7], wherein the metal compound (B1) is a metal oxide.

[9] The catalyst according to any one of [1] to [8], further comprising a platinum-based compound (C1).

[10] The catalyst according to any one of [1] to [9], wherein the catalyst is oxidized by reduction of carbon dioxide and reduced by hydrogen.

[11] A catalyst mixture comprising the catalyst according to any one of [1] to [10] and an inactive buffering material.

[12] The catalyst mixture according to [11], wherein the inactive buffering material is an inorganic oxide.

[13] The catalyst mixture according to [11] or [12], wherein the inactive buffer material is at least one selected from the group consisting of an oxide comprising a group 4 element and an oxide comprising a group 14 element.

[14] A carbon dioxide reducing method for reducing carbon dioxide using the catalyst according to any one of [1] to [10] or the catalyst mixture according to [11] to [13], wherein
a catalyst reduction reaction to reduce the catalyst and a carbon dioxide reduction reaction to reduce carbon dioxide by the catalyst are carried out.

[15] The carbon dioxide reducing method according to [14], wherein a reaction temperature in the carbon dioxide reduction reaction is equal to or higher than an equilibrium reaction onset temperature of the metal compound (B1).

[16] The carbon dioxide reducing method according to [14] or [15], wherein the reaction temperature in the carbon dioxide reduction reaction is 700° C. or less.

[17] An apparatus for reducing carbon dioxide, comprising the catalyst according to any one of [1] to [10] or the catalyst mixture according to any one of [11] to [13].

[18] The apparatus for reducing carbon dioxide according to [17], comprising: a first reactor comprising the catalyst or the catalyst mixture; a carbon dioxide supplier; a hydrogen supplier; and a switching system, wherein
the first reactor is coupled by the switching system alternately to the carbon dioxide supplier or to the hydrogen supplier.

[19] The apparatus for reducing carbon dioxide according to [18], further comprising a second reactor comprising the catalyst or the catalyst mixture, wherein
the first reactor and the second reactor are coupled by the switching system alternately to the carbon dioxide supplier or to the hydrogen supplier.

Advantageous Effects of Invention

In the present invention, it is possible to provide a catalyst resulting in a higher reduction ratio even when carbon dioxide is reduced at a relatively low temperature.

DESCRIPTION OF EMBODIMENT

[Catalyst]

Figure 1:
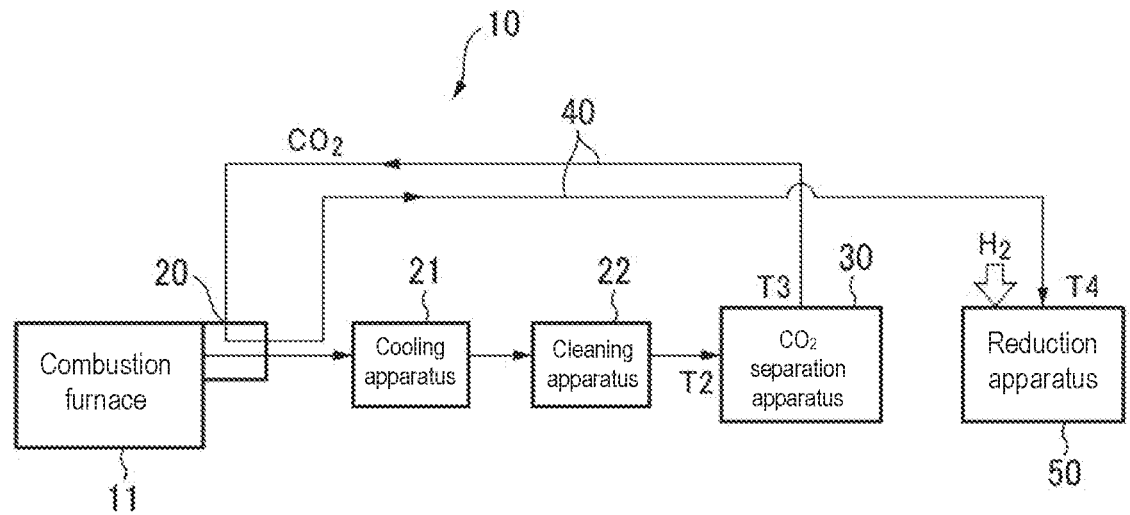
FIG. 1 is a schematic view illustrating one embodiment of a carbon dioxide reduction system in which a catalyst of the present invention is used.

The catalyst of the present invention contains a transition metal oxide (A) and a metal compound (B1) and is used in chemical looping, for example.

The catalyst of the present invention is used as a catalyst for reducing carbon dioxide, for example. More specifically, a catalyst reduction reaction to reduce the catalyst by hydrogen or the like (first process) and a carbon dioxide reduction reaction to reduce carbon dioxide using the catalyst to thereby produce a reduced product such as carbon monoxide (second process) are each carried out. Additionally, the catalyst is used in chemical looping in which the catalyst is subjected to circulation (looping) between these catalyst reduction reaction and carbon dioxide reduction reaction, or the like. The catalyst of the present invention may be oxidized by reduction of carbon dioxide as well as may be reduced by hydrogen.

Hereinbelow, each of the components used in the catalyst of the present invention will be described in detail.

[Transition Metal Oxide (A)]

The catalyst of the present invention contains, as the transition metal oxide (A), at least a first transition metal oxide (A1). In the present invention, causing the oxide (A1) to be supported on a metal compound (B1) mentioned below can make the reduction ratio of carbon dioxide higher even when the reduction reaction is carried out at a relatively low temperature.

The catalyst of the present invention also preferably contains the first transition metal oxide (A1) and a second transition metal oxide (A2), as the transition metal oxide (A). In the present invention, causing the oxide (A1) and the oxide (A2) to be supported on the metal compound (B1) mentioned below makes the reduction ratio of carbon dioxide higher, and additionally allows the catalyst performance to be satisfactorily maintained even when the catalyst is repeatedly used. Thus, the catalyst life becomes longer.

The first transition metal oxide (A1) is a compound represented by the general formula $M^1O_x$. The first transition metal oxide (A1) is a compound that reduces carbon dioxide in the catalyst. In the general formula described above, $M^1$ is a transition metal element, and x is a positive real number. In the description hereinbelow, note that $M^1$ may be referred to as the first transition metal element. Here, x is preferably 0.5 or more and 6 or less, more preferably 1 or more and 4 or less, and further preferably 1 or more and 3 or less.

The first transition metal oxide (A1) is capable of generating a compound represented by the general formula $M^1O_{x-n}$ by reduction. In the general formula $M^1O_{x-n}$, M and x are as defined above, and n is a positive real number equal to or smaller than x. n is usually a value smaller than x. n is preferably 0.05 or more and 5 or less, more preferably 0.10 or more and 3 or less, and further preferably 0.15 or more and 2 or less.

The compound represented by the general formula $M^1O_x$ is reduced in the first process to become the compound represented by the general formula $M^1O_{x-n}$. The compound represented by the general formula $M^1O_{x-n}$ is oxidized in the second process to become the compound represented by the general formula $M^1O_x$. Thereby, the catalyst can be used in circulation between the carbon dioxide reduction reaction and the catalyst reduction reaction.

The first transition metal oxide (A1) is not particularly limited as long as $M^1O_x$ is reduced to $M^1O_{x-n}$ and $M^1O_{x-n}$ is oxidized to $M^1O_x$. When oxidation and reduction can be achieved in this manner, the metal oxide can be used for reduction of carbon dioxide such as chemical looping.

The transition metal element constituting the first transition metal oxide (A1) has a plurality of oxidization concept states. Here, "has a plurality of oxidization concept states" means a metal element that may take a plurality of valences, for example, $Fe^{+2}$ and $Fe^{+3}$ in the case of iron.

Specific examples of the first transition metal element include iron, titanium, molybdenum, yttrium, chromium, lanthanum, and niobium. One of these transition metal elements may be used singly or two or more of these may be used in combination. When two or more of these are used in combination, the oxide (A1) can be made into a composite oxide as mentioned below. Note that the first and second transition metal elements are other transition metal elements than platinum-based metals.

The first transition metal element is preferably iron, molybdenum, and chromium among the transition metal elements described above. Particularly, the first transition metal element preferably contains iron. Use of these metal elements makes the reduction ratio of carbon dioxide higher. It is likely to reduce carbon dioxide also at a low temperature.

The first transition metal oxide (A1) is typically a simple oxide, which is an oxide of a single metal, but may be a composite oxide. Examples of the composite oxide include composite oxides containing two or more transition metal elements. In other words, in the general formula $M^1O_x$, $M^1$ may contain two or more transition metal elements. Among these, the first transition metal oxide (A1) is preferably a simple oxide.

The oxide (A1) may be amorphous or may have crystallinity. A crystalline structure to be formed by the transition metal oxide (A) may be any crystalline structure.

Preferred examples of the first transition metal oxide (A1) include iron oxides such as $Fe_2O_3$, $Fe_3O_4$, and FeO, titanium oxide such as $TiO_2$, Ti/Fe ores, molybdenum oxides such as $MoO_6$, $MoO_3$, and $MoO_4$, and chromium oxide such as $Cr_2O_7$, $CrO_5$, $CrO_3$, $Cr_2O_3$, and CrO. Among these, a first transition metal oxide (A1) containing iron as the transition metal is preferred, particularly iron oxide is more preferred, and in respect of a high oxidization number, $Fe_2O_3$ is further preferred.

The second transition metal oxide (A2) is an oxide of a transition metal different from the first transition metal element and represented by the general formula $M^2O_y$. In the general formula $M^2O_y$, $M^2$ is a transition metal element and different from $M^1$, and y is a positive real number. Note that the $M^2$ transition metal element may be referred to as the second transition metal element. Here, y is preferably 0.5 or more and 6 or less, more preferably 1 or more and 4 or less, and further preferably 1 or more and 3 or less.

The second transition metal oxide (A2) may be a reducible compound like the oxide (A1), but may be a compound not to be reduced. Additionally, such a reducible compound is preferably reduced at a higher temperature than that at which the first transition metal oxide (A1) is reduced.

The second transition metal oxide (A2) is typically a simple oxide, which is an oxide of a single metal. The second transition metal oxide (A2) may be amorphous or may have crystallinity. A crystalline structure to be formed by the oxide (A2) may be any crystalline structure.

An example of the second transition metal element is cerium (Ce). Use of cerium improves the catalytic performance after repeated use. An example of the second transition metal oxide (A2) is cerium oxide and is preferably $CeO_2$.

Accordingly, in the present invention, it is preferred that the first transition metal element be iron and the second transition metal element be cerium. It is more preferred that the first transition metal oxide (A1) be $Fe_2O_3$ and the second transition metal oxide (A2) be $CeO_2$. Use of iron oxide and cerium oxide in combination as the oxides (A1) and (A2) makes the catalyst activity satisfactory as well as allows the catalyst performance to be maintained further satisfactorily even after repeated use.

The catalyst of the present invention is preferably an oxide oxygen-deficient-type catalyst. The oxide oxygen-deficient-type catalyst reduces the transition metal oxide (A) such as the first transition metal oxide (A1) described above to make the transition metal oxide (A) oxygen-deficient. However, the oxygen-deficient catalyst is preferred because the catalyst reduces carbon dioxide when carbon dioxide is brought into contact with the catalyst.

In the case where the catalyst of the present invention contains the second transition metal oxide (A2) in addition to the first transition metal oxide (A1), the mass ratio of the second transition metal element to the first transition metal element in the catalyst (second transition metal element/first transition metal element) is preferably 5/95 or more and 80/20 or less. When the mass ratio is within the range, the catalyst life is likely to be longer while the carbon dioxide reduction ratio is enhanced. From such a viewpoint, the mass ratio is preferably 15/85 or more and 75/25 or less and more preferably 35/65 or more and 65/35 or less.

[Metal Compound (B1)]

The metal compound (B1) is a metal compound that is capable of adsorbing carbon dioxide, and supports the first transition metal oxide (A1). When the catalyst contains the first transition metal oxide (A1) and the second transition metal oxide (A2) as the transition metal oxide (A), the metal compound (B1) supports the first transition metal oxide (A1) and the second transition metal oxide (A2). However, the metal compound (B1) is a compound different from the transition metal oxide (A). A supporting method is not particularly limited, and it is preferred that the oxide (A1) alone or the oxides (A1) and (A2) in admixture be made to be supported on the surface of the metal compound (B1).

The catalyst of the present invention, when having the oxide (A1) and the metal compound (B1) supporting the oxide (A1), results in a higher reduction ratio even when carbon dioxide is reduced at a relatively low temperature.

When the catalyst has the oxides (A1) and (A2) and the metal compound (B1) supporting the oxides (A1) and (A2), the reduction ratio is enhanced even when carbon dioxide is reduced at a relatively low temperature. Additionally, the catalyst performance is satisfactorily maintained even after repeated use, and the catalyst life becomes longer.

In the present invention, the reason why the result described above is achieved is not clear, but the reason is presumed to be as follows. That is, the metal compound (B1) as the support adsorbs carbon dioxide, and carbon dioxide is fixed on the support. It is presumed that the fixed carbon dioxide comes in contact with the first transition metal oxide (A1) to be disposed on the surface of the support, by a so-called surface migration phenomenon, and is effectively reduced by the oxide (A1), and thereby, the reduction ratio of carbon dioxide becomes satisfactory.

When the catalyst is repeatedly used as in the chemical looping process (first and second processes), the first transition metal oxide (A1) repeats expansion and contraction. However, when the second transition metal oxide (A2) is further supported in addition to the metal compound (B1), it is presumed that the second transition metal oxide (A2) serves as a buffer layer to prevent the catalyst from breaking to thereby allow the catalyst performance to be maintained satisfactorily even after repeated use.

The metal compound (B1) may chemically adsorb carbon dioxide or may physically adsorb carbon dioxide. Here, a metal compound that chemically adsorbs carbon dioxide is a compound that reacts with carbon dioxide to capture the carbon dioxide in the molecular thereof. The metal compound that physically adsorbs carbon dioxide is a compound that captures carbon dioxide via Van der Wags or the like without intervention of a chemical reaction. The metal compound (B1) preferably chemically adsorbs carbon dioxide.

Examples of the metal element constituting the metal compound (B1) include the group 2 elements such as beryllium, magnesium, calcium, strontium, and barium, and zinc. Among these metal elements, a metal element of the group 2 elements is preferably contained. Particularly, magnesium is preferred from the viewpoints of the temperature at which carbon dioxide reduction reaction can be carried out and of the temperatures of absorption and desorption of carbon dioxide to and from the metal compound (B1).

The metal compound (B1) is preferably a metal oxide. The metal oxide is preferably one that reacts with carbon dioxide to capture the carbon dioxide in the molecular thereof to thereby adsorb carbon dioxide. The metal oxide may be a simple oxide of the metals described above but may be a composite oxide containing two or more metals described above or may be a composite oxide containing the metal element described above and additionally an element other the metals or the like.

The metal compound (B1) preferably has a theoretical amount of carbon dioxide adsorbed of 20 mass % or more. The theoretical amount adsorbed means an amount of carbon dioxide that can be theoretically adsorbed by the metal compound (B1) and is a value expressed on the metal compound (B1) basis. For example, in the case of a metal oxide, the amount can be calculated from the reaction formula of the metal compound (B1) and the carbon dioxide. Specifically, in the case of MgO (MW: 40.3), theoretically, one molecule of the metal compound (B1) reacts with one molecule of carbon dioxide ($CO_2$, MW: 44) to produce $MgCO_3$, and the theoretical amount adsorbed can be calculated as 44/40.3×100=109 mass %.

The higher the theoretical amount adsorbed, the better. The theoretical amount adsorbed is more preferably 35 mass % or more and further preferably 70 mass % or more. A theoretical amount adsorbed of 35 mass % or more enhances the performance of one molecule of carbon dioxide to be adsorbed to one molecule of the metal compound.

The higher the theoretical amount adsorbed, the better. The upper limit thereof is usually 200 mass % or less and preferably 150 mass % or less.

Specific examples of the oxide include beryllium oxide (BeO theoretical amount adsorbed: 176 mass %), magnesium oxide (MgO theoretical amount adsorbed: 109 mass %), calcium oxide (CaO, theoretical amount adsorbed: 78 mass %), strontium oxide (SrO, theoretical amount adsorbed: 42 mass %), barium oxide (BaO, theoretical amount adsorbed: 29 mass %), and zinc oxide (ZnO, theoretical amount adsorbed: 54 mass %).

A reaction in which the oxide of each metal described above adsorbs carbon dioxide will be an exothermic reaction. Accordingly, the metal compound (B1) adsorbs carbon dioxide to generate heat, and thus, it is more likely to facilitate reduction of carbon dioxide by the transition metal oxide (A).

Among the compounds described above, from the viewpoint of the adsorption performance of carbon dioxide and the reactivity with carbon dioxide, magnesium oxide, calcium oxide, and strontium oxide are preferred, and magnesium oxide (MgO) is most preferred.

One metal compound (B1) may be used singly or two or more metal compounds (B1) may be used in combination.

The catalyst is preferably used in a carbon dioxide reduction reaction in which the reaction temperature is equal to or higher than an equilibrium reaction onset temperature of the metal compound (B1). The equilibrium reaction onset temperature means, when the metal compound (B1) reacts with the carbon dioxide described above and adsorbs the carbon dioxide, a temperature at which an adsorption reaction, which is an equilibrium reaction, is started. For example, when the metal compound (B1) is magnesium oxide (MgO), the equilibrium reaction onset temperature is of the order of 250° C. under 1 atmospheric pressure. When the reaction temperature is equal to or higher than the equilibrium reaction onset temperature, carbon dioxide is supplied to transition metal oxide (A) by a surface migration phenomenon, and carbon dioxide is appropriately reduced. Note that, with respect to the equilibrium reaction of the metal compound (B1), it is possible to refer to Energy & Fuels 2007, 21, 426-434 "Screening of $CO_2$ Adsorbing Materials for Zero Emission Power Generation Systems" and the like.

The content of the metal compound (B1) in the catalyst is preferably 100 parts by mass or more and 2000 parts by mass or less based on the total amount, 100 parts by mass, of the oxide (A1) and the oxide (A2). Note that, in the case where no oxide (A2) is contained, the total amount of the oxide (A1) and the oxide (A2) is the amount of oxide (A1) alone. Setting the amount of the oxide (A1) alone or the total amount of the oxide (A1) and the oxide (A2) to 100 parts by mass or more makes carbon dioxide to be moderately adsorbed to facilitate reduction of carbon dioxide by the catalyst. It is also possible to cause the transition metal oxide (A) to be appropriately supported on the metal compound (B1). Additionally, setting the content to 2000 parts by mass or less allows the content ratio of the transition metal oxide (A) in the catalyst to be a certain content ratio to thereby facilitate reduction of carbon dioxide.

The above-described content of the metal compound (B1) is, from these viewpoints, more preferably 200 parts by mass or more and 2000 parts by mass or less, further preferably 250 parts by mass or more and 1500 parts by mass or less, and particularly preferably 300 parts by mass or more and 1000 parts by mass or less.

The catalyst of the present invention may have a metal compound other than the oxides (A1) and (A2) and the metal compound (B1) described above. For example, the catalyst of the present invention may further contain a platinum-based compound (C1). When the catalyst contains the platinum-based compound (C1), the platinum-based compound (C1) and the transition metal compound (A) (i.e., the oxide (A1) or the oxides (A1) and (A2)) may be supported on the metal compound (B1). The platinum-based compound (C1) functions as a catalyst that adsorbs carbon dioxide or facilitates reduction of carbon dioxide to thereby facilitate reduction of carbon dioxide and the like.

The platinum-based compound (C1) is a compound containing a platinum group element. Examples of the platinum group element include ruthenium, rhodium, palladium, osmium, iridium, and platinum. Among these, palladium is preferred. The platinum-based compound (C1), when containing palladium, is more likely to facilitate reduction of carbon dioxide.

The platinum-based compound (C1) may be a metal itself, may be an oxide, or may be another compound, and is preferably an oxide and particularly preferably a palladium oxide. An example of the palladium oxide is PdO.

A metal composed of the platinum-based element may compose a cluster, and a specific example of the cluster is a palladium cluster. Examples of the palladium cluster include ones represented by a chemical formula: $Pd_7$ or $Pd_6$-M, wherein M is any of Ni, Cu, Pt, and Rh. The palladium clusters having the structure, as described in A G Saputro et al., 2016 J. Phys.: Conf. Ser. 739 012083 and the like, can absorb carbon dioxide and are more likely to facilitate reduction of carbon dioxide.

The content of the platinum-based compound (C1) in the catalyst is 0.2 parts by mass or more and 50 parts by mass or less, preferably 0.5 parts by mass or more and 30 parts by mass or less, and more preferably 2 parts by mass or more and 15 parts by mass or less based on the total amount, 100 parts by mass, of the oxide (A1) and the oxide (A2). Setting the content to the lower limit or higher is more likely to facilitate reduction of carbon dioxide. Additionally, setting the content to the upper limit or lower allows an effect corresponding to the content to be easily achieved.

When the platinum-based compound (C1) is used, the ratio of the content of the platinum-based compound (C1) to the content of the metal compound (B1) (C1/B1) is, for example, 1/1000 or more and 5 or less, preferably 1/980 or more and 4 or less, more preferably 1/970 or more and 4/5 or less. Setting the content to the lower limit or higher facilitates synthesis of carbon monoxide, and setting the content to the upper limit or lower leads to cost reduction.

The shape of the catalyst is granular, for example. Granular is a concept including powdery, particulate, lumpy, pellet-shaped, and the like. The shape may be any of spherical, planar, polygonal, crushed, columnar, needle-like, scaly shapes or the like. Accordingly, in the catalyst, the transition metal oxide (A) or the like may be bound to the surface of the particulate metal compound (B1).

The average particle size of the catalyst is, for example, 1 µm or more and 10 mm or less, preferably 10 µm or more and 6 mm or less, and more preferably 20 µm or more and 5 mm or less. When the average particle size of the catalyst is set within the range, it is more likely to enhance the reaction ratio of an endothermic reaction.

Note that, in the present description, the average particle size means the average value of the particle sizes of arbitrary 200 catalyst particles in one field observed with an electron microscope. In this case, the "particle size" means the maximum length among the distances between two points on the contour of a catalyst particle. The average particle size is, for example, lumpy or the like. In the case where primary particles are aggregated, the average particle size means the average particle size of secondary particles.

The catalyst has a specific surface area, as measured by the BET method, of preferably 1 $m^2/g$ or more and 500 $m^2/g$ or less, more preferably 3 $m^2/g$ or more and 450 $m^2/g$ or less, and further preferably 5 $m^2/g$ or more and 400 $m^2/g$ or less. When the specific surface area is within the range described above, it is more likely to enhance the reaction ratio.

[Method for Producing Catalyst]

Subsequently, a method for producing the catalyst of the present invention will be described. Note that, in the following description, raw materials to obtain the transition metal oxide (A), the metal compound (B1), and the platinum-based compound (C1) will be described as a transition metal oxide raw material (a), a metal compound raw material (b1), and a platinum-based raw material (c1), respectively.

In the present production method, the metal compound (B1) is provided. The metal compound (B1) may be provided by, for example, firing the metal compound raw material (b1).

The metal compound raw material (b1) is not limited as long as the raw material is fired to become the metal compound (B1), and is preferably a metal salt. As the metal to be used in the metal salt, a metal constituting the metal compound (B1) described above will be used. Examples of the metal salt for use in the metal compound raw material (b1) include nitrates, sulfates, chlorides, and composites thereof, and among these, sulfates are preferred. Accordingly, in the case where the transition metal is magnesium, magnesium nitrate, magnesium sulfate, magnesium chloride, magnesium hydroxide, magnesium hydroxide carbonate, or the like may be used. In the case where the metal compound (B1) contains two or more components, two or more metal salts may be used in admixture. Further, as the metal salt, a hydrate may be used as appropriate.

The firing temperature for the metal compound raw material (b1) is, for example, 300 to 1200° C. and preferably 350 to 800° C. The metal compound raw material (b1) will become preferably an oxide when fired. Firing the material (b1) within the temperature range easily enables the material (b1) to be an oxide. Additionally, setting the firing temperature to 300° C. or more enables impurities adhering on the surface to be removed. Setting the firing temperature to 1200° C. or less can prevent excessive particle growth.

The temperature may be raised at, for example, a temperature raising rate of 1 to 20° C./minute and preferably at a temperature rising rate of 2 to 10° C./minute to the raised temperature. Setting the temperature rising rate to the lower limit or higher can facilitate particle production, and setting the temperature rising rate to the upper limit or lower can avoid cracking of crystals.

The firing time for the metal compound raw material (b1) is preferably 1 to 24 hours and more preferably 1.5 to 20 hours. Setting the firing time to the lower limit or longer allows an oxide to be formed and also enables impurities adhering on the surface to be removed. Setting the firing time to the upper limit or shorter can prevent excessive particle growth.

Then, it is preferred that the metal compound (B1) provided above having a component to be the raw material of the transition metal oxide (A) (transition metal oxide raw material (a)) adhering thereto be fired to form the transition metal oxide (A).

The transition metal oxide raw material (a) is composed of a first transition metal oxide raw material (a1) that is fired to be a first transition metal oxide, or the first transition metal oxide raw material (a1) and a second transition metal oxide raw material (a2) that is fired to be a second transition metal oxide. The raw materials (a1) and (a2) are not particularly limited as long as the materials are ones that are each fired to be a transition metal oxide (A), but transition metal salts are preferred. In the case where the catalyst contains the first transition metal oxide (A1) and the second transition metal oxide (A2), it is preferred that a mixture of the raw materials (a1) and (a2) adhering to the metal compound (B1) be fired.

Examples of the transition metal salt include nitrates, sulfates, chlorides, hydroxides, carbonates, and composites thereof, and among these, nitrates are preferred in respect of the solubility in a plurality of solvents and the solubility in water. Accordingly, in the case where the first transition metal element is iron, as the metal salt of the first transition metal element, iron nitrate, iron sulfate, iron chloride, or the like may be used, but iron nitrate is preferred. In the case where the second transition metal is cerium, cerium nitrate, cerium sulfate, cerium chloride, or the like may be used, but cerium nitrate is preferred.

Accordingly, in the case where the first transition metal element is iron and the second transition metal element is cerium, it is more preferred to use a mixture of iron nitrate and cerium nitrate as the transition metal oxide raw material (a). As the transition metal salt, a hydrate is preferably used as appropriate. Specifically, in terms of weighting accuracy, iron nitrate nonahydrate is preferably used, and a mixture of iron nitrate nonahydrate and cerium nitrate hexahydrate is more preferably used.

Additionally, it is preferred that the raw material transition metal oxide raw material (a) described above (i.e., the raw material (a1) or a mixture of the raw material (a1) and the raw material (a2)) be dissolved in water to form an aqueous solution and the aqueous solution be caused to adhere to the metal compound (B1), from the viewpoint of homogeneous dispersion, for example. Specifically, it is preferred that the metal compound (B1) be mixed in an aqueous solution of the transition metal oxide raw material (a) to thereby cause the transition metal oxide raw material (a) to adhere to the metal compound (B1). Alternatively, the transition metal oxide raw material (a) may be caused to adhere to the metal compound (B1) by application of an aqueous solution of the transition metal oxide raw material (a) to the metal compound (B1), impregnation of the metal compound (B1) with the aqueous solution, or the like. After the mixing, application, or impregnation describe above, drying or the like may be carried out. Further, as required, after the transition metal oxide raw material (a) was caused to adhere, neutralization may be carried out with an alkali component such as an ammonia aqueous solution. In the case where drying is carried out, drying may be carried out after the neutralization.

The drying may be carried out at a temperature of preferably 20 to 200° C. and more preferably 50 to 150° C. for 0.5 to 5 hours and preferably 1 to 4 hours, for example. When the drying is carried out in this manner, homogeneous drying can be achieved.

The transition metal oxide raw material (a), after caused to adhere to the metal compound (B1) as described above, may be fired. The firing temperature for the transition metal oxide raw material (a) is not particularly limited as long as an oxide is formed by heating at the firing temperature, but is, for example, 350 to 1200° C. and preferably 400 to 1000° C. Setting the firing temperature to 350° C. or more enables impurities adhering on the surface to be removed. Setting the firing temperature to 1200° C. or less can prevent excessive particle growth. The temperature may be raised at, for example, a temperature raising rate of 1 to 20° C./minute and preferably at a temperature rising rate of 2 to 10° C./minute to the raised temperature. Setting the temperature rising rate to the lower limit or higher can facilitate particle generation, and setting the temperature rising rate to the upper limit or lower can avoid cracking of crystals.

The firing time for the transition metal oxide raw material (a) is preferably 1 to 24 hours and more preferably 1.5 to 20 hours. Setting the firing time to the lower limit or longer allows an oxide to be formed and also enables impurities adhering on the surface to be removed. Setting the firing time to the upper limit or shorter can prevent excessive particle growth.

In the case where the catalyst further contains the platinum-based compound (C1), first, the metal compound (B1) may be provided. Then, one raw material selected from the group consisting of the transition metal oxide raw material (a) and the platinum-based raw material (c1) may be caused to adhere to the metal compound (B1) described above, and firing may be carried out. Finally, the remaining one raw material selected from the group consisting of the transition metal oxide raw material (a) and the platinum-based raw material (c1) may be further caused to adhere thereto, and firing may be carried out.

Among these, from the viewpoint of achieving a high reaction rate by collision and reaction between the catalyst and a gas during a gas reaction, it is preferred that the metal compound (B1) be provided, then the transition metal oxide raw material (a) be caused to adhere to the metal compound (B1) described above, firing be carried out, thereafter, the platinum-based raw material (c1) be caused to further adhere thereto, and firing be carried out.

The platinum-based raw material (c1) is not particularly limited as long as the raw material (c1) is fired to be the platinum-based compound (C1), but a metal salt of the platinum-based element described above is preferred. Examples of the metal salt include nitrates, sulfates, chlorides, hydroxides, and composite thereof, and among these, chlorides are preferred. Accordingly, in the case where the platinum-based element is palladium, palladium nitrate, palladium sulfate, palladium chloride, palladium hydroxide, or the like may be used, but palladium chloride is preferred. In the case where two or more platinum-based elements are contained, two or more metal salts may be mixed and used. Further, as the metal salt, a hydrate may be used as appropriate.

The adhesion method and the firing method for the transition metal oxide raw material (a) are as described above. The adhesion method for the platinum-based raw material (c1) may be carried out by a known method such as mixing, application, or impregnation, as for the raw material (a). The details thereof are as described above. The platinum-based raw material (c1) may be dissolved in water to form an aqueous solution and the aqueous solution may be caused to adhere. After application or impregnation, drying may be carried out.

The firing temperature for the platinum-based raw material (c1) is, for example, 300 to 1200° C. and preferably 350 to 800° C. The metal compound raw material (b1) will become preferably an oxide or a metal when fired. Firing the material (b1) within the temperature range easily enables the material (b1) to form an oxide or a metal. Setting the firing temperature to 300° C. or more enables impurities adhering on the surface to be removed. Setting the firing temperature to 1200° C. or less can prevent excessive particle growth. The temperature may be raised at, for example, a temperature raising rate of 1 to 20° C./minute and preferably at a temperature rising rate of 2 to 10° C./minute to the raised temperature. Setting the temperature rising rate to the lower limit or higher can facilitate particle production, and setting the temperature rising rate to the upper limit or lower can avoid cracking of crystals.

The firing time for the platinum-based raw material (c1) is preferably 1 to 24 hours and more preferably 1.5 to 10 hours. Setting the firing time to the lower limit or longer can remove impurities adhering on the surface. Setting the firing time to the upper limit or shorter can prevent excessive particle growth.

When the catalyst is produced by the production method of the preferred embodiment described above, the oxide (A1), the oxide (A1) and the oxide (A2), the oxide (A1) and the platinum-based compound (C1), or the oxide (A1), the oxide (A2), and the platinum-based compound (C1) is/are bound to the metal compound (B1). Accordingly, an interaction between the transition metal oxide (A) and the metal compound (B1) or the like enables carbon dioxide to be more efficiently reduced.

Note that the method for causing the transition metal oxide (A) to be supported on the surface of the metal compound (B1) is not limited to the method described above and that the transition metal oxide (A) may be caused to adhere to the surface of the metal compound (B1) via sputtering or the like. The platinum-based compound (C1) may be caused to adhere to the surface of the metal compound (B1) in the same manner via sputtering or the like.

[Catalyst Mixture]

The present invention also provides a catalyst mixture containing the catalyst described above. The catalyst mixture contains an inactive buffer material in addition to the catalyst describe above. The inactive buffer material is mixed with the catalyst described above and used. The inactive buffer material is not bound to the catalyst or the like, and is mixed with the catalyst without causing a chemical bond with each component of the catalyst.

The catalyst of the present invention described above is an endothermic reaction catalyst. Accordingly, an endothermic reaction facilitated or caused to proceed by the catalyst of the present invention absorbs heat around the catalyst. A decrease in the temperature due to such an endothermic reaction is propagated to thereby cause the reaction temperature in the entire system to decrease, and thus, the endothermic reaction may become unlikely to proceed. In the catalyst mixture, an inactive buffer material is mixed in the catalyst and embedded among the catalyst. For this reason, the decrease in the temperature caused by the endothermic reaction partially becomes unlikely to be propagated, and the temperature in the entire system is prevented from decreasing. Thereby, the reaction ratio of the endothermic reaction is satisfactorily maintained.

The catalyst of the present invention is an endothermic reaction catalyst, which oxidizes or reduces the transition metal acid compound (A) itself and simultaneously reduces or oxidizes another compound, is used as a catalyst for chemical looping as described above. In the case of an endothermic reaction catalyst, in which the catalyst itself is oxidized or reduced, or of a catalyst for chemical looping, in order to activate the catalyst to cause an oxidization or reduction reaction to proceed, heating at a relatively high temperature is generally required. Thus, the catalyst absorbs a large amount of thermal energy, and the temperatures of and around the catalyst relatively markedly decrease. In a catalyst mixture, even when a large decrease in the temperature occurs in the catalyst, the decrease in the temperature is more unlikely to be propagated to the other catalysts due to the inactive buffer material. Thus, the catalyst mixture can sufficiently prevent the reaction ratio from decreasing.

The inactive buffer material is inactive on the endothermic reaction facilitated by the catalyst and causes the endothermic reaction neither to be facilitated nor to proceed. As the inactive buffer material, an inorganic oxide is preferably used. The inorganic oxide is a compound other than the transition metal oxide (A) described above, and examples thereof include oxides each containing a group 4 element and oxides each containing a 14 group element. The oxide may be a simple oxide of the element described above or may be a composite oxide containing these.

Examples of the group 4 element include titanium, zirconium, and hafnium. Examples of the group 14 element include silicon, germanium, tin, and lead.

Examples of the composite oxide include composite oxides of two or more of the elements described above or composite oxides of one or more selected from the group consisting of these and at least another one element.

Use of such an oxide as mentioned above causes propagation of a decrease in the temperature caused by the endothermic reaction to more easily be prevented and causes a decrease in the reaction ratio of the endothermic reaction to be more easily prevented.

Specific examples of the inorganic oxide include titania, zirconia, hafnium oxide, silica, germanium oxide, tin oxide, and lead oxide.

As the inactive buffer material, from the viewpoint of preventing propagation of a decrease in the temperature and improving the reaction ratio, among those described above, titania, zirconia, silica, germanium oxide, tin oxide, and lead oxide are preferred, titania, zirconia, silica, and germanium oxide are more preferred, titania, zirconia, and silica are further preferred, zirconia and silica are particularly preferred, and silica is most preferred.

One inactive buffer material may be used singly or two or more inactive buffer materials may be used in combination.

The inactive buffer material is granular, for example. Granular, as described above, is a concept including powdery, particulate, lumpy, pellet-shaped, and the like. The shape may be any of spherical, planar, polygonal, crushed, columnar, needle-like, scaly shapes or the like. In the present invention, preferably, both the inactive buffer material and the catalyst are mixed in a granular shape, and thus, the inactive buffer material is more likely to be embedded among the catalyst. It is more preferred that both the inactive buffer material and the catalyst be homogeneously dispersed in a granular shape and mixed.

The average particle size of the inactive buffer material is, for example, 1 μm or more and 10 mm or less, preferably 3 μm or more and 1 mm or less, and more preferably 5 μm or more and 500 μm or less. When the average particle size of inactive buffer material is set within the range, it is more likely to prevent a decrease in the temperature caused by the endothermic reaction.

The ratio of the average particle size of the inactive buffer material to the average particle size of the catalyst is preferably 1/20 or more and 20 or less, more preferably 1/10 or more and 10 or less, and further preferably 1/5 or more and 5 or less. When the average particle size is set within the range, the inactive buffer material and the catalyst are moderately mixed to thereby cause the endothermic reaction to sufficiently proceed, and additionally, a decrease in the temperature caused by the endothermic reaction can be effectively prevented.

The volume ratio of the inactive buffer material to the catalyst in the catalyst mixture is preferably 2/8 or more and 8/2 or less, preferably 3/7 or more and 7/3 or less, and preferably 4/6 or more and 6/4 or less.

When the volume ratio is set within the range, an effect caused by use of the inactive buffer material is more likely to be exerted as well as defects such as a decrease in the reaction efficiency caused by the inactive buffer material are more unlikely to occur.

Note that the catalyst mixture may be composed of a catalyst and an inactive buffer material but may contain a material other than the catalyst and the inactive buffer material as long as the effects of the present invention may not be compromised. The content of such a material is, for example, 20 vol % or less, preferably 10 vol % or less, and further preferably 5 vol % or less based on the total volume of the catalyst mixture.

[Method for Producing Catalyst Mixture]

The catalyst mixture can be obtained by mixing the above-described catalyst and inactive buffer material provided in advance. The mixing may be carried out using a known mixer, which is not particularly limited. For example, a mixer such as a vessel movable-type mixer in which the vessel itself is rotated or shaken to mix the content loaded therein (i.e., the catalyst and inactive buffer material) and a stirring-type mixer in which the content is mixed with a screw provided inside the vessel or the like may be used. The catalyst mixture thus obtained is placed and used in a reactor as mentioned below.

[Method for Using Catalyst]

The catalyst of the present invention is used, for example, in chemical looping as described above. The catalyst of the present invention is also used as a catalyst for reducing carbon dioxide as described above. More specifically, a catalyst reduction reaction to reduce the catalyst and a carbon dioxide reduction reaction to reduce carbon dioxide using the catalyst may be carried out. The catalyst is used so as to be circulated between the carbon dioxide reduction reaction and the catalyst reduction reaction. The catalyst reduction reaction to reduce the catalyst uses a reducing agent.

The catalyst of the present invention is also preferably used in a so-called reverse shift reaction. The reverse shift reaction is a reaction that produces carbon monoxide and water from carbon dioxide and hydrogen. The reverse shift reaction is, for chemical looping, is divided and carried out in a catalyst reduction reaction (first process) and a carbon dioxide reduction reaction (second process). The catalyst reduction reaction is a reaction represented by the following formula (A), and the carbon dioxide reduction reaction is a reaction represented by the following formula (B).

$$H_2 \text{ (gas)} + MO_x \text{ (solid)} \rightarrow H_2O \text{ (gas)} + MO_{x-n} \text{ (solid)} \quad (A)$$

$$CO_2 \text{ (gas)} + MO_{x-n} \text{ (solid)} \rightarrow CO \text{ (gas)} + MO_x \text{ (solid)} \quad (B)$$

Wherein, in formulas (1) and (2), M, x, and n are as defined above.

In other words, in the catalyst reduction reaction, hydrogen as the reducing agent is oxidized to produce water. In the carbon dioxide reduction reaction, carbon dioxide is reduced to produce carbon monoxide.

The reaction temperature for the catalyst reduction reaction may be a temperature at which a reduction reaction can proceed, but is, for example, 300° C. or more, preferably 400° C. or more, more preferably 500° C. or more, and further preferably 550° C. or more. Setting the temperature to 400° C. or more makes the reduction reaction likely to proceed, and particularly setting the temperature to 500° C. or more enables the reduction reaction to proceed efficiently.

The temperature for the catalyst reduction reaction is, for example, 850° C. or less, preferably 750° C. or less, and more preferably 700° C. or less. Setting the temperature to these upper values or less enables the economic efficiency to be improved.

The reaction temperature for the carbon dioxide reduction reaction is, for example, 300° C. or more, preferably 350° C. or more, and more preferably 400° C. or more. Setting the temperature to these lower values or higher enables the carbon dioxide reduction reaction to proceed appropriately.

Note that the reaction temperature for the carbon dioxide reduction reaction in the chemical looping described above may be preferably equal to or higher than the equilibrium reaction onset temperature of the metal compound (B1) as described above, in the case where the metal compound (B) contains the metal compound (B1).

The reaction temperature of the carbon dioxide reduction reaction in the chemical looping described above is specifically 1000° C. or less, preferably 850° C. or less, more preferably 700° C. or less, and further preferably 650° C. or less. The catalyst of the present invention enables the reduction reaction to be carried out at a high reduction ratio even at a low temperature and thus enables the carbon dioxide reduction reaction to be carried out at a relatively low temperature. Setting the temperature to 650° C. or less enables waste heat to be utilized. Further, the reaction temperature for the carbon dioxide reduction reaction also can be set to 450° C. or less. Setting the temperature to 450° C. or less enables the economic efficiency to be further improved.

Note that, in the present invention, a reduced product to be obtained in the carbon dioxide reduction reaction may be a product other than carbon monoxide, and a specific example is methane. The reduced products obtained in the carbon dioxide reduction reaction described above, such as carbon monoxide, may be further converted to an organic material or the like via microbial fermentation or the like. An example of the microbial fermentation is anaerobic fermentation. Examples of the organic material to be obtained include methanol, ethanol, acetic acid, butanol, derivatives thereof, or mixtures thereof, and C5 or higher compounds such as isoprene.

Further, the reduced products such as carbon monoxide may be converted by metal oxide or the like into C1 to C20 compounds including hydrocarbons and alcohols, which have been conventionally synthesized by petroleum chemistry. Examples of specific compounds to be obtained include methane, ethane, propylene, methanol, ethanol, propanol, acetaldehyde, diethyl ether, acetic acid, butyric acid, diethyl carbonate, and butadiene.

(Reduction Apparatus)

The chemical looping of the present invention may be carried out in various reduction apparatuses, and is carried out in, for example, an apparatus for reducing carbon dioxide to reduce carbon dioxide. The apparatus for reducing carbon dioxide is an apparatus having the catalyst described above. The apparatus for reducing carbon dioxide may be a catalyst-fixed gas exchanging-type apparatus or may be a catalyst circulation-type apparatus.

(Catalyst-Fixed Gas Exchanging Type Reduction Apparatus)

A catalyst-fixed gas exchanging-type is a reduction apparatus in which a catalyst is fixed and that switches gases supplied to the reactor to carry out chemical looping. The catalyst-fixed gas exchanging-type reduction apparatus has a reactor packed with a catalyst (first reactor), and a supply port and a discharge port connected to the reactor.

In the catalyst-fixed gas exchanging-type reduction apparatus, carbon dioxide (gas) is supplied from the supply port to the reactor, and a carbon dioxide reduction reaction, in which carbon dioxide is reduced by the catalyst, is carried out inside the reactor. In the carbon dioxide reduction reaction, carbon monoxide is usually produced.

Additionally, a reducing agent (gas) is supplied from the supply port to the reactor, and a catalyst reduction reaction, in which the catalyst is reduced, is carried out. The reducing agent is typically hydrogen. When hydrogen is the reducing agent, water is generally produced in the catalyst reduction reaction.

In the catalyst-fixed gas exchanging-type reduction apparatus, the gas supplied from the supply port is switched between carbon dioxide and the reducing agent every predetermined time. Thereby, the carbon dioxide reduction reaction and the catalyst reduction reaction are alternately carried out.

The catalyst serves as the reducing agent to be oxidized in the carbon dioxide reduction reaction. Additionally, the oxidized catalyst is reduced by a reducing agent such as hydrogen supplied to the reactor in the catalyst reduction reaction, and is used again in the carbon dioxide reduction reaction. Thus, the catalyst of the present invention is used in circulation (looping) between the carbon dioxide reduction reaction and the catalyst reduction reaction.

The catalyst-fixed gas exchanging-type reduction apparatus may preferably further have a carbon dioxide supplier, a hydrogen supplier, and a switching system. The carbon dioxide supplier is not particularly limited as long as the supplier can supply carbon dioxide. The carbon dioxide supplier may be a facility that discharges carbon dioxide (carbon dioxide discharging facility) such as a power generation facility, an incineration facility, or a steel manufacturing facility, or may be a cylinder filled with carbon dioxide therein. The hydrogen supplier is also not particularly limited, and may be a facility that produces hydrogen or may be a cylinder filled with hydrogen therein.

The switching system may be one that couples the reactor alternately to the carbon dioxide supplier or to the hydrogen supplier. Note that "couples" referred to herein means that the carbon dioxide supplier or the hydrogen supplier is connected with the reactor such that carbon dioxide from the carbon dioxide supplier or hydrogen from the hydrogen supplier is supplied to the reactor.

The carbon dioxide supply time for carrying out the carbon dioxide reduction reaction is appropriately adjusted in accordance with the type, size, and the like of the apparatus, and is preferably one minute or more and 180 minutes or less and more preferably two minutes or more and 120 minutes or less. Setting the supply time to one minute or more facilitates the system control, and setting the supply time to 180 minutes or less enables the reaction to be carried out with a small amount of the catalyst.

The reducing agent supply time for carrying out the catalyst reduction reaction is, for example, one minute or more and 120 minutes or less and preferably one minute or more and 60 minutes or less. Setting the supply time to one minute or more facilitates the system control, and setting the supply time to 120 minutes or less enables the reaction to be carried out with a small amount of the catalyst.

The catalyst-fixed gas exchanging-type reduction apparatus may have first and second reactors each packed with the catalyst. In the case where the apparatus has the first and second reactors, a line through which carbon dioxide is supplied from the carbon dioxide supplier of the carbon dioxide discharging facility or the like described above is preferably connected to each reactor. Additionally, to each of the first and second reactors, a line through which the reducing agent such as hydrogen is supplied from the hydrogen supplier described above is also preferably connected. Also in the case of having the first and second reactors, the catalyst-fixed gas exchanging-type reduction apparatus preferably has a switching system, and the first reactor and the second reactor are coupled alternately to the carbon dioxide supplier or to the hydrogen supplier via the switching system.

With the configuration described above, even when carbon dioxide is continuously discharged from the carbon dioxide discharging facility, carbon dioxide is continuously reduced in the catalyst-fixed gas exchanging-type reduction apparatus by switching the reactors to which carbon dioxide is supplied between the first and second reactors. In contrast, while carbon dioxide is not supplied, supplying the reducing agent to the first and second reactors causes the catalyst oxidized in the carbon dioxide reduction reaction to be reduced such that the catalyst can be reused in reduction of carbon dioxide.

The carbon dioxide supply time to each reactor is appropriately adjusted in accordance with the type, size, and the like of the apparatus, but is, for example, one minute or more and 180 minutes or less and more preferably two minutes or more and 120 minutes or less. Setting the supply time to one minute or more facilitates the system control, and setting the supply time to 180 minutes or less enables the reaction to be carried out with a small amount of the catalyst.

The reducing agent supply time to each reactor is, for example, one minute or more and 120 minutes or less and preferably one minute or more and 60 minutes or less. Setting the supply time to one minute or more facilitates the system control, and setting the supply time to 120 minutes or less enables the reaction to be carried out with a small amount of the catalyst.

The switching system described above is not particularly limited. It is preferred that a valve or the like be provided on the line connecting the supply port of the first reactor (or the first and second reactors) with each of the carbon dioxide supplier and the hydrogen supplier and that the valve be opened or closed such that each reactor be coupled alternately to the carbon dioxide supplier or to the hydrogen supplier. Alternatively, it is also preferred that, in the switching system, the supply port of the first reactor (or the first and second reactors) be connected to the carbon dioxide supplier or the hydrogen supplier via a branch pipe or the like and the gases supplied to the supply port of the reactor (carbon dioxide or hydrogen) be switched at the branch pipe such that each of the reactors be coupled alternately to the carbon dioxide supplier or to the hydrogen supplier. The switching system is preferably controlled such that the carbon dioxide or reducing agent (hydrogen) supply time falls within the predetermined range described above.

Note that the catalyst-fixed gas exchanging-type reduction apparatus may have three or more reactors and carbon dioxide may be supplied sequentially to the three or more reactors.

(Catalyst Circulation-Type Reduction Apparatus)

The catalyst circulation-type reduction apparatus causes the catalyst to be circulated among a plurality of reactors to carry out chemical looping. The catalyst circulation-type reduction apparatus has first and second reactors that carry out the carbon dioxide reduction reaction and the catalyst reduction reaction, respectively, and a catalyst circulation path that causes the catalyst to be circulated between the two reactors. In the catalyst circulation-type reduction apparatus, carbon dioxide is supplied to the first reactor to carry out the carbon dioxide reduction reaction described above, and a reduced material (for example, carbon monoxide) is discharged. Additionally, a reducing agent (for example, hydrogen) is supplied to the second reactor to carry out the catalyst reduction reaction that reduces the catalyst. In the second reactor, reduction of the catalyst causes the reducing agent to be oxidized, and an oxidized material (for example, water) is discharged as a gas.

Additionally, the catalyst oxidized in the first reactor is conveyed to the second reactor, and the catalyst reduced in the second reactor is conveyed to the first reactor to thereby cause the catalyst to be circulated. Causing the catalyst to be circulated between the reactors in this manner enables the catalyst to be continuously used for a long period without being inactivated, even when the carbon dioxide reduction reaction and the catalyst reduction reaction are continuously carried out in the first reactor and the second reactor, respectively.

Note that, in the description of the method for use described above, the case where the catalyst is used has been specifically described. Also in the case where a catalyst mixture is used, the catalyst mixture may be used instead of the catalyst, and the other constituents are the same. Thus, the description thereof is omitted.

In the case where the reduction apparatus has two or more reactors, at least one reactor may be packed with the catalyst, and the other reactor(s) may be packed with the catalyst mixture.

[Carbon Dioxide Reduction System]

The reduction apparatus is used in connection with various carbon dioxide discharge facilities, and is preferably used in a carbon dioxide reduction system which heats carbon dioxide by utilizing the thermal energy generated in a combustion furnace provided in a carbon dioxide discharge facility. Hereinbelow, a preferred embodiment of the carbon dioxide reduction system will be described in detail.

FIG. 1 shows a carbon dioxide reduction system 10 in an embodiment of the present invention. The carbon dioxide reduction system 10 comprises a combustion furnace 11, a heat exchanger 20, a carbon dioxide separation apparatus 30, a circulation path 40, and a reduction apparatus 50.

(Combustion Furnace)

Examples of the combustion furnace 11 in the carbon dioxide reduction system 10 include an incinerator that incinerates waste materials. The type of the incinerator is not particularly limited, and known ones such as a stoker type incinerator, a fluidized bed-type incinerator, a kiln-type incinerator, and a gasification melting furnace are used. The incinerator may include a combination of two or more of these types. Among these, a stoker type incinerator is particularly preferred as the combustion furnace 11. The combustion furnace 11 is not limited to ones that incinerates waste materials, and may be ones in which the exhaust gas generated by combustion of combustibles contains carbon dioxide, such as a blast furnace which burns coke or the like other than waste materials. As the combustion furnace 11, an incinerator that incinerates waste materials is preferred.

Figure 2:
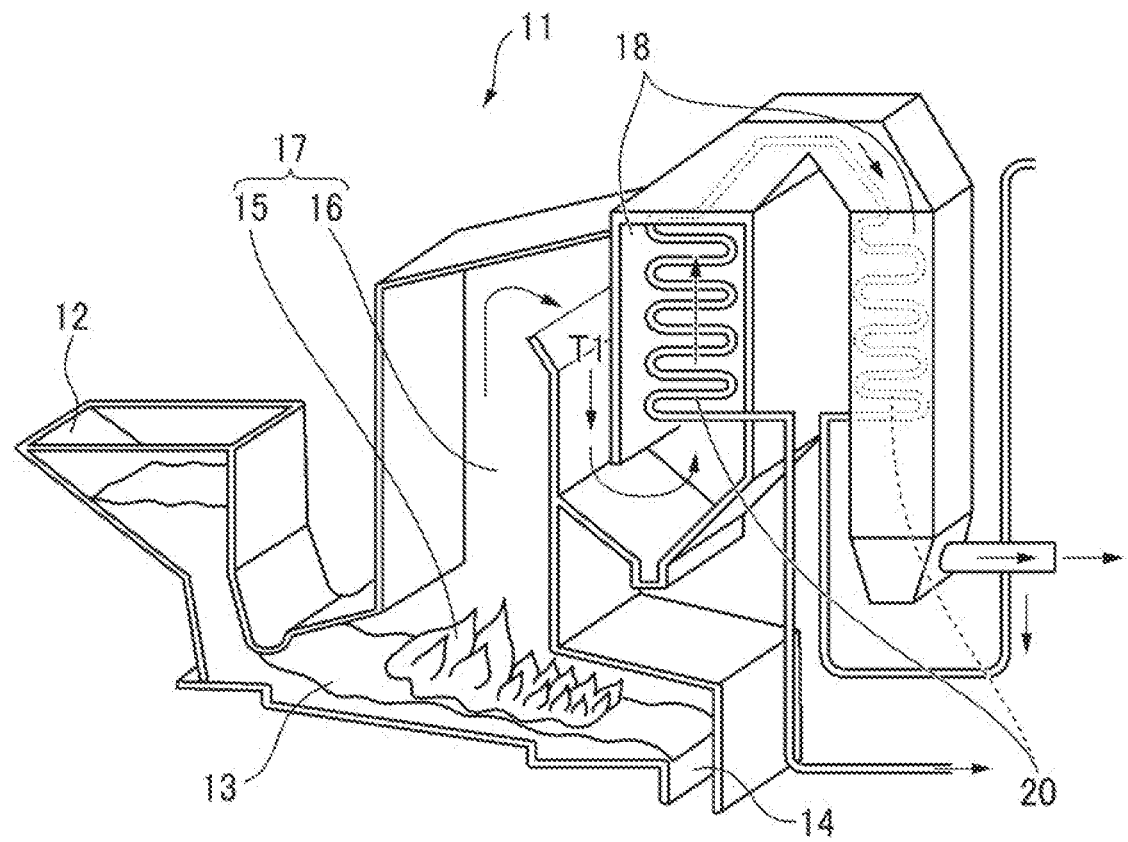
FIG. 2 is a schematic view illustrating one exemplary combustion furnace for use in the carbon dioxide reduction system.

FIG. 2 is a schematic view of the combustion furnace 11 which is a stoker type incinerator. As shown in FIG. 2, the stoker type incinerator includes an introduction port 12 through which combustibles such as waste materials are introduced, a stoker 13 on which the combustibles are burned, and an ash discharge port 14 through which incineration ash produced by combustion in the stoker 13 is discharged.

In general, the stoker 13 is in a stepwise form or in an inclined form, and the combustibles placed to an upper stage of the stoker 13 from the introduction port 12 is dried on the upper stage of the stoker 13, and then sent to the middle stage, such that the combustibles are burned in the middle stage. Subsequently, the burned combustibles are sent to the rear stage and subjected to post combustion in the rear stage to make an incineration ash, which is discharged from the ash discharge port 14. In order to burn the combustibles in the stoker 13, oxygen, air, etc., are sent from, for example, underneath of the stoker 13.

In the combustion furnace 11, a combustion chamber 17 in which combustibles are burned is composed of a lower combustion chamber 15 where a stoker is disposed, and a gas combustion chamber 16 connected to the upper part of the lower combustion chamber 15. The gas generated by combustion in the stoker 13 is subjected to further combustion in the gas combustion chamber 16. The gas subjected to further combustion in the gas combustion chamber 16 is emitted as exhaust gas outside the combustion furnace 11 through an exhaust gas path 18 connected to the gas combustion chamber 16 (i.e., combustion chamber 17), and sent to a carbon dioxide separation apparatus 30 as described below.

The exhaust gas contains carbon dioxide generated by combustion of the combustibles. In general, the exhaust gas may contain nitrogen, oxygen, carbon monoxide and water (water vapor) other than carbon dioxide. Alternatively, depending on the fuel type of the combustion furnace 11, the exhaust gas may be a mixed gas containing carbon monoxide and hydrogen in addition to carbon dioxide. Accordingly, the exhaust gas may further contain carbon monoxide and hydrogen in addition to the gases described above.

The exhaust gas may contain, for example, 2 to 30 mass % of carbon dioxide, 15 to 45% of carbon monoxide, 10 to 50% of hydrogen, 25 to 67 mass % of nitrogen, 0.5 to 20 mass % of oxygen, and 5 to 40 mass % of water. Alternatively, the exhaust gas may contain, for example, 2.5 to 25 mass % of carbon dioxide, 35 to 70 mass % of nitrogen, 4 to 18 mass % of oxygen, and 10 to 35 mass % of water.

The temperature $T1$ of the exhaust gas sent to the exhaust gas path 18 from the combustion chamber 17 is high, because the gas is in the immediate aftermath of combustion. Specifically, the temperature is, for example, 200 to 1300° C., preferably 300 to 900° C.

In the above case, the combustion chamber 17 including the lower combustion chamber 15 and the gas combustion chamber 16 is shown, but the lower combustion chamber 15 may be directly connected to the exhaust gas path 18 without the gas incineration chamber 16. Although the case where the combustion furnace is a stoker type incinerator has been described as an example, the combustion furnace may be any type, and a known combustion furnace having a combustion chamber and an exhaust gas path may be appropriately used.

(Heat Exchanger)

The carbon dioxide reduction system 10 has the heat exchanger 20 as described above. In the present embodiment, the heat exchanger 20 is attached to the exhaust gas path 18. The heat exchanger 20 cools the exhaust gas sent from the combustion chamber 17 and present in the inner part of the exhaust gas path 18.

As described below, the medium passing through the inner part of the heat exchanger 20 is carbon dioxide separated by the carbon dioxide separation apparatus 30. The carbon dioxide in the inner part of the heat exchanger 20 is heated by heat exchange with exhaust gas at high temperature sent from the combustion chamber 17 and present in the inner part of the exhaust gas path 18.

The heat exchanger 20 may be in any form, and may be either a tube type or a plate type, or a combination thereof. The tube type may have, for example, a heat transfer tube wound in a coil form or in a condenser form, or a bundle of a plurality of tubes. Although the heat exchanger 20 may be arranged in the inner part of the exhaust gas path 18 as shown in FIG. 2 or along the outer peripheral surface of the exhaust gas path 18, arrangement in the inner part of the exhaust gas path 18 is preferred.

Also, in the inner part of the exhaust gas path 18, a heat exchanger (not shown in drawing) other than the heat exchanger 20 may be arranged, so that the exhaust gas in the inner part of the exhaust gas path 18 can be cooled by the heat exchanger additionally. Such a heat exchanger may constitute, for example, a part of a boiler, so that a medium in the inner part of the heat exchanger heated by the exhaust gas may be used to drive the boiler.

The exhaust gas cooled by the heat exchanger 20 is emitted outside the combustion furnace 11 through the exhaust gas path 18 and sent to the carbon dioxide separation apparatus 30 as shown in FIG. 1. On this occasion, although the exhaust gas may be sent directly to the carbon dioxide separation apparatus 30, sending to the carbon dioxide separation apparatus 30 after various treatments is preferred.

For example, as shown in FIG. 1, a cooling apparatus 21 may be installed on the path between the exhaust gas path 18 and the carbon dioxide separation apparatus 30, so that the exhaust gas cooled by the heat exchanger 20 can be further cooled by the cooling apparatus 21 and then sent to the carbon dioxide separation apparatus 30. The cooling apparatus 21 is not particularly limited, and examples thereof include a heat exchanger, a cooling tower, and the like. The cooling tower for use may be a one generally used for an incinerator, such as a water spray type and an air-cooled type.

Also, on the path between the exhaust gas path 18 and the carbon dioxide separation apparatus 30, a cleaning apparatus 22 may be arranged, so that the exhaust gas cooled by the heat exchanger 20 can be cleaned by the cleaning apparatus 22 and then sent to the carbon dioxide separation apparatus 30. Examples of the cleaning apparatus 22 include a soot-dust removal apparatus such as a bag filter, various adsorption filters such as an activated carbon filter, a nitrogen oxide removal apparatus such as a denitrification reaction tower, and an acid gas removal apparatus, and soot dust, dioxin, hydrogen chloride, sulfur oxide, nitrogen oxide, organic substances, etc., are removed by these cleaning apparatuses.

In the carbon dioxide reduction system 10, any one of the cooling apparatus 21 and the cleaning apparatus 22 may be arranged, both of them may be arranged, or none of them may be arranged. Alternatively, a processing apparatus other than the cooling apparatus 21 and the cleaning apparatus 22 may be arranged. As for the cooling apparatus 21 and/or the cleaning apparatus 22, a single unit or a plurality of units may be arranged.

The exhaust gas to be sent to the carbon dioxide separation apparatus 30 is cooled by the heat exchanger 20 as described above, and further cooled by the cooling apparatus 21 on as needed basis as described above, so that the temperature of the exhaust gas decreases. However, depending on the type of the carbon dioxide separation apparatus 30, for example, in the case of the carbon dioxide separation apparatus 30 having heat resistance, the exhaust gas may be sent to the carbon dioxide separation apparatus 30 without undergoing cooling by the cooling apparatus 21. Alternatively, the exhaust gas may be sent to the carbon dioxide separation apparatus 30 without undergoing cooling by the heat exchanger 20 as described below, or without undergoing cooling by any one of the heat exchanger 20 and the cooling apparatus 21.

The temperature T2 of the exhaust gas sent to the carbon dioxide separation apparatus 30 is, for example, preferably 0 to 500° C., more preferably 5 to 450° C. With a temperature T2 in the range, carbon dioxide can be appropriately separated from the exhaust gas without placing a load on the carbon dioxide separation apparatus 30. Furthermore, pressure may be applied to the exhaust gas emitted through the exhaust gas path 18 by a blower or the like (not shown in drawing), so that the exhaust gas in a pressurized state can be sent to the carbon dioxide separation apparatus 30.

(Carbon Dioxide Separation Apparatus)

The carbon dioxide separation apparatus 30 separates carbon dioxide from the exhaust gas sent from the fuel furnace 11. The separation type of the carbon dioxide separation apparatus 30 is not particularly limited, and examples thereof include a chemical absorption, absorption by solid, and membrane separation. Examples of the apparatus for use in chemical absorption include an apparatus that absorbs carbon dioxide in an exhaust gas into a solution of amine or the like to achieve separation, and an apparatus utilizing pressure swing adsorption (PSA). Examples of the apparatus for use in absorption by solid include a solid absorber capable of absorbing carbon dioxide, supported on a porous support. Alternatively, an apparatus using thermal swing adsorption (TSA) may be employed. Examples of the apparatus for use in membrane separation include a carbon dioxide separation membrane. Examples of the carbon dioxide separation membrane include a PBI (polybenzimidazole) typed separation membrane. The PBI typed separation membrane has heat resistance, capable of separating carbon dioxide even from an exhaust gas having relatively high temperature. Among them, use of the carbon dioxide separation membrane is preferred.

In the present invention, the separation of carbon dioxide in the carbon dioxide separation apparatus 30 requires no strict isolation of carbon dioxide from the exhaust gas, so long as separation into a gas with an increased content of carbon dioxide and another gas is achieved. The carbon dioxide content in the gas with an increased content of carbon dioxide is preferably 30 to 100 mass %, more preferably 55 to 99 mass %. Hereinbelow, the gas with an increased content of carbon dioxide is simply described as the separated carbon dioxide to simplify the description.

The separated carbon dioxide is sent to the heat exchanger 20 through the circulation path 40 so as to be used as a medium passing through the inner part of the heat exchanger 20. On this occasion, the temperature T3 of the separated carbon dioxide is, for example, 0 to 550° C., preferably 5 to 450° C. Accordingly, the separated carbon dioxide undergoes heat exchange with the exhaust gas generated in the inner part of the combustion furnace 11 so as to be heated in the inner part of the heat exchanger 20. The thermal energy generated by the combustion in the inner part of the combustion furnace 11 is thereby efficiently used.

The carbon dioxide heated in the heat exchanger 20 is sent to the reduction apparatus 50 through the circulation path 40. On the other hand, the exhaust gas generated in the combustion furnace 11 is cooled by the carbon dioxide passing through the inner part of the heat exchanger 20 and emitted outside the combustion furnace 11 as described above so as to be sent to the carbon dioxide separation apparatus 30.

The carbon dioxide separated in the carbon dioxide separation apparatus 30 may be sent to the reduction apparatus 50 through the circulation path 40, with a pressure being applied to the carbon dioxide, for example, by a blower or the like. On this occasion, the pressure of the inner part of the circulation path 40 is, for example, preferably 101.35 to 999 kPa, more preferably 101.50 to 500 kPa. With a pressure applied to the carbon dioxide passing through the circulation path 40, heat exchange is efficiently performed in the heat exchanger 20.

The carbon dioxide separated in the carbon dioxide separation apparatus 30 may be circulated to pass through the inner part of the heat exchanger 20, but may be circulated to also pass through, for example, the inner part of a heat exchanger for use in the cooling apparatus 21 described above. In other words, the separated carbon dioxide may pass through the inner part of the heat exchanger of the cooling apparatus 21 and the inner part of the heat exchanger 20 in this order so as to be sent to the reduction apparatus 50. In such an mode, the separated carbon dioxide is more efficiently heated by the thermal energy generated in the combustion furnace 11.

(Reduction Apparatus)

The carbon dioxide heated in the heat exchanger 20 and the like is supplied to the reduction apparatus 50, and the carbon dioxide is reduced therein. As the reduction apparatus 50, the reduction apparatus described above is used to reduce the carbon dioxide by carrying out chemical looping. In the reduction apparatus 50, reduced products such as carbon monoxide can be obtained by reduction of carbon dioxide.

The temperature T4 of the carbon dioxide supplied to the reduction apparatus 50 is preferably 200 to 900° C., more preferably 300 to 700° C. With a temperature T4 of carbon dioxide in the range, additional heating in the reduction apparatus 50 can be decreased, or carbon dioxide can be reduced without heating.

To the reduction apparatus 50, a reducing agent such as hydrogen is supplied as described above, and the reducing agent is preferably also heated when supplied. Specifically, it is preferred that the reducing agent to be supplied be heated to, for example, 200° C. or more. The temperature of the reducing agent is preferably 200° C. or more and 700° C. or less and more preferably 200° C. or more and 650° C. or less.

A method for heating the reducing agent such as hydrogen is not particularly limited. The reducing agent may be heated, as in the case of carbon dioxide, by causing the reducing agent to pass, as a medium, inside the heat exchanger attached to the combustion furnace (exhaust gas path) or inside the heat exchanger of the cooling apparatus 21 or may be heated by a different method.

It is preferred that the reduced product such as the carbon monoxide obtained in the reduction apparatus 50 be further converted to an organic material or the like via microbial fermentation, compound synthesis by means of a metal catalyst, or the like, as described above. In the reduction apparatus 50, the reducing agent such as hydrogen is reduced to be water or the like. It is preferred that the material obtained such as water, after discharged from the reactor, be liquefied or the like appropriately.

Although a heat exchanger that cools the exhaust gas containing carbon dioxide generated in a combustion furnace is provided in the preferred embodiment described above, the heat exchanger may not be provided and the exhaust gas containing carbon dioxide generated in a combustion furnace may be sent to a carbon dioxide separation apparatus without cooling by a heat exchanger.

However, in this case also, as the separated carbon dioxide needs to be heated by the heat generated in the combustion furnace, the carbon dioxide may be heated by, for example, passing the carbon dioxide separated by the carbon dioxide separation apparatus through a pipe that is inserted in the combustion chamber.

The reduction system above heats the carbon dioxide separated in the carbon dioxide separation apparatus by use of the thermal energy generated in the combustion furnace and then reduces the carbon dioxide in the reduction apparatus, enabling the carbon dioxide contained in exhaust gas generated in the combustion furnace to be efficiently reduced. Additionally, the reduction system uses carbon dioxide, which has a large heat capacity and is inert, as the heat recovery medium, enabling the heat generated in the combustion furnace to be recovered safely and efficiently.

EXAMPLES

Hereinbelow, the present invention will be further described in detail with reference to Examples, but the present invention is not intended to be limited thereto.

In Examples 1 to 3 and Comparative Examples 1 to 2 hereinbelow, catalysts were produced, and the catalyst performance was evaluated.

Example 1

(Preparation of Catalyst)

An iron aqueous solution was prepared by dissolving 3.4 g of iron nitrate nonahydrate (manufactured by FUJIFILM Wako Pure Chemical Corporation, reagent) in 20 g of water. As a support, 2 g of magnesium oxide (MgO, manufactured by FUJIFILM Wako Pure Chemical Corporation, reagent) (metal compound (B1)) was transferred to a vial, and 23.4 g of the iron aqueous solution was added thereto. The mixture was stirred with a hot stirrer for four hours while heated at 80° C., then left to stand for two hours, and dried. Thereafter, the dried product was fired in an electric furnace at a temperature rising rate of 2.5° C./min and a firing temperature 415° C. for a firing time of 16 hours to obtain a particulate (average particle size: 10 µm, specific surface area: 66 m$^2$/g) catalyst in which iron oxide ($Fe_2O_3$) as the transition metal oxide (A) was supported on magnesium oxide. The magnesium oxide content was 500 parts by mass based on 100 parts by mass of the iron oxide.

Note that the mass of each molecule was measured by inductively coupled plasma atomic emission spectroscopy (ICP-AES). Specifically, first, a measurement sample was prepared by the following method. In other words, 50 mg of the catalyst was dissolved in 20 mL of hydrochloric acid (concentration: 60 mass %). In the case where the residue remained, 20 mL of concentrated nitric acid was further added thereto. The obtained solution was sealed and heated at 65° C. for 30 minutes and subsequently at 100° C. for 70 minutes using an oven to decompose the catalyst. The measurement sample was prepared by adding ultrapure water (ultrapure water manufactured by a "Milli-Q Water Purification System" manufactured by Merck KGaA) to the solution obtained to result in a volume of 50 mL.

The measurement sample obtained was introduced to inductively coupled plasma atomic emission spectroscopy (ICP-AES) and measured. The measurement conditions are as follows.

Apparatus: CCD multi-ICP atomic emission spectrophotometer (manufactured by SPECTRO Analytical Instruments)

Interference removal gas mode: Ar

Measurement system: radial spectrophotometry system

Measurement method: calibration curve method. A standard solution containing a measurement element at a known concentration, a two-fold dilution and a 10-fold dilution thereof, and a control solution were provided. The control solution, the 10-fold dilution, the two-fold dilution, and the standard solution (mother liquor) were introduced to ICP-AES in this order to form a calibration curve.

(Catalyst Evaluation)

A rapid catalyst screening system (manufactured by Frontier Laboratories Ltd., "Single µ-Reactor Rx-3050SR") including a microreactor and a gas chromatograph-mass spectrometer (GC/MS) directly connected to the microreactor was used to evaluate the catalyst in accordance with the following procedure.

First, a reaction tube having an inner diameter of 3 mm was packed with the catalyst obtained above to a height of 4 cm. A catalyst reduction reaction was carried out by causing hydrogen gas at a flow rate of 30 ml/min to flow through the microreactor to reduce the catalyst. At this time, the gas discharged from the discharge port of the reactor contained water vapor. Thereafter, for gas exchange, nitrogen gas was cause to flow at a flow rate of 50 ml/min for 10 minutes. Then, a carbon dioxide reduction reaction was carried out by causing carbon dioxide gas to flow at a flow rate of 1.4 ml/min for 50 minutes to reduce the carbon dioxide gas. At this time, the gas discharged from the discharge port of the reactor contained carbon monoxide. Thereafter, for gas exchange, nitrogen gas was caused to flow at a flow rate of 50 ml/min for 10 minutes. Note that the temperature of the reactor was maintained at 650° C. in the present test.

In the carbon dioxide reduction reaction, the gas discharged from the discharge port was analyzed with the gas chromatograph-mass spectrometer to measure the amount of carbon dioxide consumed and the amount of carbon monoxide generated per one minute and per 1 g of the catalyst. The results are shown in Table 1.

Note that the measurement conditions in the gas chromatograph-mass spectrometer are as follows.
Column temperature: 200° C.
Injection temperature: 200° C.
Detector temperature: 250° C.
Column: EGA tube (L: 2.5 m, φ 0.15 mm ID, t: 0 mm)
Column flow rate: 1.00 mL/min
Split ratio: 60
Purge flow rate: 3.0 mL/min Example 2

To 0.6 g of the catalyst obtained in Example 1, 0.2 g of a hydrochloric acid aqueous solution of palladium chloride (palladium chloride concentration: 0.5 mass %, manufactured by Sigma-Aldrich Co. LLC, reagent) was added, and the solution was left to stand for an hour. After the solution was dried in an oven at 110° C. for two hours, the dried product was fired in an electric furnace at a temperature rising rate of 5° C./min and a firing temperature of 400° C. for a firing time of 4.5 hours to obtain a catalyst (average particle size: 10 μm, specific surface area: 52 $m^2/g$) in which the transition metal oxide (A) and a platinum-based compound including palladium (C1) (palladium oxide (PdO)) were supported on the magnesium oxide.

The amount supported was measured in the same manner as in Example 1 except that the method for preparing a measurement sample was changed as follows. In this case, in the method for preparing a measurement sample, 50 mg of the catalyst was dissolved with 20 ml of concentrated hydrochloric acid. Then, 20 mL of aqua regia (concentrated hydrochloric acid:concentrated nitric acid=3:1 (volume ratio)) was added thereto to completely dissolve the catalyst. The obtained solution was sealed with a lid and heated at 65° C. for 30 minutes and subsequently at 100° C. for 70 minutes using an oven to decompose the catalyst. The measurement sample was prepared by adding ultrapure water (ultrapure water manufactured by a "Milli-Q Water Purification System" manufactured by Merck KGaA) to the solution obtained to result in a volume of 50 mL.

The amount of the platinum-based compound (C1) supported in the catalyst was 5 parts by mass based on 100 parts by mass of the iron oxide. The magnesium oxide content was 500 parts by mass based on 100 parts by mass of the iron oxide. Thereafter, the obtained catalyst was evaluated in the same manner as in Example 1.

Example 3

(Preparation of Catalyst)

An iron aqueous solution was prepared by dissolving 3.4 g of iron nitrate nonahydrate (manufactured by FUJIFILM Wako Pure Chemical Corporation, reagent) in 20 g of water. Two grams of zinc oxide (ZnO) (manufactured by Sigma-Aldrich Co. LLC, reagent) as the metal compound (B1) was transferred to a vial, and 23.4 g of an iron aqueous solution was added thereto. The solution was stirred with a hot stirrer for four hours while heated at 80° C., then left to stand for two hours, and dried. Thereafter, the dried product was fired in an electric furnace at a temperature rising rate of 2.5° C./min and a firing temperature of 415° C. for a firing time of 16 hours to obtain a catalyst (average particle size: 1 μm, specific surface area: 10 $m^2/g$) in which iron oxide ($Fe_2O_3$) as the transition metal oxide (A) was supported on the metal compound (B1) (ZnO).

When the content of the zinc oxide was measured in the same manner as in Example 1, the content of the zinc oxide was 500 parts by mass based on 100 parts by mass of the iron oxide. Thereafter, the obtained catalyst was evaluated in the same manner as in Example 1.

Comparative Example 1

Magnesium hydroxide carbonate (manufactured by Sigma-Aldrich Co. LLC, BioXtra grade) was fired in an electric furnace at a temperature rising rate of 5° C./min and a firing temperature of 400° C. for a firing time of 16 hours to obtain magnesium oxide (MgO). Thereafter, the magnesium oxide (MgO) was evaluated as a catalyst (average particle size: 10 μm, specific surface area: 70 $m^2/g$) in the same manner as in Example 1.

Comparative Example 2

Iron nitrate nonahydrate (FUJIFILM Wako Pure Chemical Corporation, reagent) was fired in an electric furnace at 700° C. to obtain iron oxide ($Fe_2O_3$) (specific surface area: 11 $m^2/g$). Thereafter, the iron oxide was evaluated as a catalyst in the same manner as in Example 1.

The results of Examples 1 to 3 and Comparative Examples 1 and 2 are shown in Table 1.

TABLE 1

| | Amount of $CO_2$ consumed over 10 minutes (μmol) | μmol-CO/g-cat/min |
|---|---|---|
| Example 1 | 55.1 | 38.1 |
| Example 2 | 60.5 | 41.3 |
| Example 3 | 26.8 | 18.5 |
| Comparative Example 1 | 0 | 0 |
| Comparative Example 2 | 16 | 11.1 |

As clearly seen from the above results, in the catalyst of each example described above, the first transition metal oxide (A1) was supported in the metal compound (B1). Thus, even if chemical looping was carried out at a low temperature, the amount of carbon dioxide consumed and the amount of carbon monoxide produced became larger. In contrast, in Comparative Examples, the catalysts used did not contain either one of the transition metal oxide (A) or the metal compound (B). Thus, the amount of carbon dioxide consumed was small, and the amount of carbon monoxide produced was also small.

In the following Examples 4 to 6 and Comparative Example 3, catalysts were produced, and the catalyst performance and catalyst life were evaluated.

Example 4

(Preparation of Catalyst)

Magnesium hydroxide carbonate (manufactured by Sigma-Aldrich Co. LLC, BioXtra grade) was fired in an electric furnace at a temperature rising rate of 5° C./min and a firing temperature of 450° C. for a firing time of 16 hours to obtain magnesium oxide (MgO) as the metal compound (B1).

Dissolved were 2.72 g of iron nitrate nonahydrate (manufactured by FUJIFILM Wako Pure Chemical Corporation, reagent) and 0.29 g of cerium nitrate hexahydrate (manufactured by Sigma-Aldrich Co. LLC, reagent) in 10 g of water to prepare an aqueous solution of mixed iron/cerium.

Then, 2 g of the obtained MgO was transferred to a hot stirrer, and the aqueous solution of mixed iron/cerium were added thereto. The hot stirrer was heated to 80° C., and water was distilled off under stirring.

Thereafter, the residue was fired under conditions of a temperature rising rate of 5° C./min and a firing temperature of 415° C. for a firing time of 16 hours to obtain a catalyst (average particle size: 20 μm, specific surface area: 54 m$^2$/g) in which iron oxide and cerium oxide ($Fe_2O_3$-$CeO_2$) were supported on the magnesium oxide (MgO) as the support.

The content of each molecule was measured in the same manner as in Example 1. The content of the magnesium oxide (support) was 417 parts by mass based on the total amount, 100 parts by mass, of the iron oxide and cerium oxide.

Example 5

A catalyst (average particle size: 20 μm, specific surface area: 54 m$^2$/g) was obtained in the same manner as in Example 4 except that 1.70 g of iron nitrate nonahydrate (manufactured by FUJIFILM Wako Pure Chemical Corporation, reagent) and 0.73 g of cerium nitrate hexahydrate (manufactured by Sigma-Aldrich Co. LLC, reagent) were dissolved in 10 g of water to prepare an aqueous solution of mixed iron/cerium.

The content of each molecule was measured in the same manner as in Example 1. The content of the magnesium oxide (support) was 417 parts by mass based on the total amount, 100 parts by mass, of the iron oxide and cerium oxide.

Example 6

(Preparation of Catalyst)

An iron aqueous solution was prepared by dissolving 3.4 g of iron nitrate nonahydrate (manufactured by FUJIFILM Wako Pure Chemical Corporation, reagent) in 10 g of water. Placed in a hot stirrer was 2.0 g of magnesium oxide (MgO) (metal compound (B1)) prepared in the same manner as in Example 4, and the iron aqueous solution described above was added thereto. The hot stirrer was heated to 80° C., and water was distilled off under stirring.

Thereafter, the residue was fired under conditions of a temperature rising rate of 5° C./min and a firing temperature of 415° C. for a firing time of 16 hours to obtain a catalyst (average particle size: 15 μm, specific surface area: 66 m$^2$/g) in which iron oxide ($Fe_2O_3$) was supported on the magnesium oxide (MgO) as the support.

When the content of the magnesium oxide was measured in the same manner as in Example 1, the content of the magnesium oxide (support) was 417 parts by mass based on the weight, 100 parts by mass, of the iron oxide.

Comparative Example 3

(Preparation of Catalyst)

Silica ($SiO_2$) (manufactured by Fuji Silysia Chemical Ltd., trade name "CARiACT Q-30") as the support was dried in an oven at 110° C. for 14 hours. Additionally, 1.70 g of iron nitrate nonahydrate (manufactured by FUJIFILM Wako Pure Chemical Corporation, reagent) and 0.73 g of cerium nitrate hexahydrate (manufactured by Sigma-Aldrich Co. LLC, reagent) were dissolved in 10 g of water to prepare an aqueous solution of mixed iron and cerium. Two grams of the dried silica (support) was transferred to a vial, and the aqueous solution of mixed iron and cerium was added thereto. The hot stirrer was heated to 80° C., and water was distilled off under stirring. Thereafter, the residue was fired under conditions of a temperature rising rate of 5° C./min and a firing temperature of 415° C. for a firing time of 16 hours to obtain a catalyst (average particle size: 2 mm, specific surface area: 90 m$^2$/g) in which iron oxide and cerium oxide($Fe_2O_3$-$CeO_2$) were supported on the support.

The content of the magnesium oxide was measured in the same manner as in Example 1 except that the method for preparing a measurement sample was changed as follows. In this case, in the method for preparing a measurement sample, 50 mg of the catalyst was dissolved in 2 mL of hydrofluoric acid, and 20 mL of concentrated hydrochloric acid was added thereto to completely dissolve the catalyst (when the residue remained, 20 mL of concentrated nitric acid was further added). The obtained solution was sealed and heated at 65° C. for 30 minutes and subsequently at 100° C. for 70 minutes using an oven to decompose the catalyst. The measurement sample was prepared by adding ultrapure water (ultrapure water manufactured by a "Milli-Q Water Purification System" manufactured by Merck KGaA) to the solution obtained to result in a volume of 50 mL.

As a result, the content of the silica (support) was 417 parts by mass iron oxide based on the total amount, 100 parts by mass, of the iron oxide and cerium oxide.

[Catalyst Evaluation]

The catalyst obtained in each of Examples and Comparative Examples was evaluated in accordance with the following evaluation methods.

(Measurement of Reduction Ratio)

A catalyst evaluation test by use of a microreactor was carried out in the same manner as in the catalyst evaluation described above. In the carbon dioxide reduction reaction in the catalyst evaluation test, the gas discharged from the discharge port was analyzed with the gas chromatograph-mass spectrometer. When the carbon dioxide gas reached the reactor, the reduction ratio of carbon dioxide to carbon monoxide over 15 minutes was measured. Note that the reduction ratio was calculated by the following expression. The measurement conditions in gas chromatograph-mass spectrometer were as described above.

$CO_2$ Reduction ratio=total molar amount of CO converted on the catalyst over 15 minutes/total molar amount of $CO_2$ passed over the catalyst over 15 minutes×100

(Catalyst Performance Maintenance Ratio)

Through a microreactor packed with the catalyst in the same manner as in the measurement of the reduction ratio described above, hydrogen gas was allowed to flow for 20 minutes, nitrogen gas for 10 minutes, carbon dioxide gas for 50 minutes, and nitrogen gas for 10 minutes. With this as one cycle, four cycles were carried out. The catalyst performance maintenance ratio (%) was calculated from the reduction ratio A (%) of carbon dioxide to carbon monoxide measured in the first cycle and the reduction ratio B (%) of carbon dioxide to carbon monoxide measured in the fourth cycle by an expression {1−(A−B)/A}×100.

The results of Examples 4 to 6 and Comparative Example 3 are shown in Table 2.

|  | First transition metal | Second transition metal | Support | Mass ratio | Reduction ratio | Catalyst performance maintenance ratio |
|---|---|---|---|---|---|---|
| Example 4 | Fe | Ce | MgO | 21/79 | 83% | 80% |
| Example 5 | Fe | Ce | MgO | 50/50 | 86% | 92% |
| Example 6 | Fe | None | MgO | 0/100 | 82% | 53% |
| Comparative Example 3 | Fe | Ce | SiO$_2$ | 50/50 | 31% | 30% |

\* The mass ratio is the mass ratio of the second transition metal element to the first transition metal element (second transition metal element/first transition metal element). Note that the mass ratio was calculated from the mass of each molecule measured by ICP-AES.

As clearly seen from the results of Table 2 above, in each of Examples 4 to 6, the catalyst was one in which at least first transition metal oxide (A1) as the transition metal oxide (A) was supported on the metal compound (B1), and thus, the reduction ratio of carbon dioxide increased. In Examples 4 and 5, the catalyst was one in which the first and second transition metal oxides (A1) and (A2) as the transition metal oxide (A) were supported on the metal compound (B1), and thus, the catalyst performance maintenance ratio after looping was repeated a plurality of times was also excellent.

In contrast, in Comparative Example 3, no metal compound (B) was used as the support. Thus, either the reduction ratio of carbon dioxide or the catalyst performance maintenance ratio was not satisfactory.

In Examples 7 to 9 and Reference Example 1 below, the catalyst mixture was evaluated.

Example 7

(Preparation of Catalyst Mixture)

Commercially available silica (reagent) was crushed, finely divided, and sieved using a sieve specified in JIS Z 8801 such that the average particle size reached 5 μm. This silica was used as an inactive buffer material. A catalyst obtained in the same manner as in Example 1 was transferred to a vial, and an inactive buffer material was added thereto. The vial was shaken to mix the content, and a catalyst mixture was obtained. Note that the volume ratio between the catalyst and the inactive buffer material was set to 5/5.

(Evaluation of Catalyst Mixture)

An evaluation test using a microreactor was carried out in the same manner as in the catalyst evaluation described above except that the reaction tube was packed with a catalyst mixture instead of the catalyst and the time during which carbon dioxide gas was caused to flow in carrying out the carbon dioxide reduction reaction was changed from 50 minutes to 20 minutes.

In the present test, the temperature of the reactor was maintained at 650° C., and the temperature decrease ratio of the catalyst immediately after the completion of the carbon dioxide reduction reaction was measured. The temperature decrease ratio (%) was calculated by an expression: (temperature of reactor−temperature of catalyst)/temperature of reactor×100.

Additionally, while the carbon dioxide reduction reaction was carried out, the gas discharged from the discharge port was analyzed with the gas chromatograph-mass spectrometer to measure the reaction ratio. The reaction ratio was calculated by an expression: amount of carbon monoxide detected (molar amount)/(amount of carbon dioxide detected (molar amount)+amount of carbon monoxide detected (molar amount))×100.

Note that the measurement condition in the gas chromatograph-mass spectrometer were as described above.

<Evaluation of Temperature Decrease Ratio>

The temperature decrease ratio was evaluated based on the following criteria.

A: The temperature decrease ratio is less than 2%.
B: The temperature decrease ratio is 2% or more and less than 3%.
C: The temperature decrease ratio is 3% or more and less than 5%.
D: The temperature decrease ratio is 5% or more.

<Evaluation of Reaction Ratio>

The reaction ratio was evaluated based on the following criteria.

A: The reaction ratio is 85% or more.
B: The reaction ratio is 75% or more and less than 85%.
C: The reaction ratio is 70% or more and less than 75%.
D: The reaction ratio is less than 70%.

Example 8

The same procedure was carried out as in Example 7 except that the inactive buffer material used was replaced by zirconia (manufactured by FUJIFILM Wako Pure Chemical Corporation, average particle size: 5 μm).

Example 9

The same procedure was carried out as in Example 7 except that the inactive buffer material used was replaced by titania (manufactured by FUJIFILM Wako Pure Chemical Corporation, average particle size: 5 μm).

Reference Example 1

The same procedure was carried out as in Example 7 except that the reaction tube was packed with only the catalyst to a height of 4 cm without using the inactive buffer material.

The results of Examples 7 to 9 and Reference Example 1 are shown in Table 3.

|  | Inactive buffer material | Temperature decrease ratio | Reaction ratio |
|---|---|---|---|
| Example 7 | Silica | A | A |
| Example 8 | Zirconia | B | B |
| Example 9 | Titania | C | C |
| Reference Example 1 | None | D | D |

As clearly seen from the above results, in Examples 7 to 9, use of the inactive buffer material enabled the temperature decrease of the catalyst inside the reactor to be prevented and further improved the reaction ratio of the carbon monoxide reduction reaction.

REFERENCE SIGNS LIST

10: REDUCTION SYSTEM
11: COMBUSTION FURNACE
12: INTRODUCTION PORT
13: STOKER
14: ASH DISCHARGE PORT
15: LOWER COMBUSTION CHAMBER
16: GAS COMBUSTION CHAMBER
17: COMBUSTION CHAMBER
18: EXHAUST GAS PATH
20: HEAT EXCHANGER
21: COOLING APPARATUS
22: CLEANING APPARATUS
30: CARBON DIOXIDE SEPARATION APPARATUS
40: CIRCULATION PATH
50: REDUCTION APPARATUS

The invention claimed is:

1. A catalyst comprising:
a first transition metal oxide (A1) represented by the general formula $M^1O_x$, wherein $M^1$ represents a transition metal element, and x represents a positive real number; and
a metal compound (B1) capable of adsorbing carbon dioxide, wherein
the first transition metal oxide (A1) is supported on the metal compound (B1), and
the first transition metal oxide (A1) is capable of generating a compound represented by the general formula $M^1O_{x-n}$ by reduction, wherein $M^1$ and x are as defined above, and n represents a positive real number equal to or less than x,
wherein the catalyst is oxidized by reduction of carbon dioxide and reduced by hydrogen.

2. The catalyst according to claim 1, wherein the transition metal element represented by $M^1$ is at least one selected from the group consisting of iron, titanium, molybdenum, yttrium, chromium, lanthanum, and niobium.

3. The catalyst according to claim 1, wherein the metal element constituting the metal compound (B1) is at least one metal selected from the group consisting of beryllium, magnesium, calcium, strontium, barium, and zinc.

4. The catalyst according to claim 1, wherein the metal compound (B1) is a metal oxide.

5. A catalyst mixture comprising the catalyst according to claim 1 and an inactive buffering material.

6. The catalyst mixture according to claim 5, wherein the inactive buffering material is an inorganic oxide.

7. The catalyst mixture according to claim 5, wherein the inactive buffer material is at least one selected from the group consisting of an oxide containing a group 4 element and an oxide containing a group 14 element.

8. A carbon dioxide reducing method for reducing carbon dioxide using the catalyst mixture according to claim 5, wherein
a catalyst reduction reaction to reduce the catalyst and a carbon dioxide reduction reaction to reduce carbon dioxide by the catalyst are carried out.

9. An apparatus for reducing carbon dioxide, comprising the catalyst mixture according to claim 5.

10. A catalyst comprising:
a first transition metal oxide (A1) represented by the general formula $M^1O_x$, wherein $M^1$ represents a transition metal element, and x represents a positive real number;
a second transition metal oxide (A2) represented by the general formula $M^2O_y$, wherein $M^2$ is a transition metal element different from $M^1$, and y is a positive real number; and
a metal compound (B1) capable of adsorbing carbon dioxide, wherein
the first transition metal oxide (A1) is supported on the metal compound (B1),
the second transition metal oxide (A2) is supported on the metal compound (B1), and
the first transition metal oxide (A1) is capable of generating a compound represented by the general formula $M^1O_{x-n}$ by reduction, wherein $M^1$ and x are as defined above, and n represents a positive real number equal to or less than x.

11. The catalyst according to claim 10, wherein the transition metal element represented by $M^2$ is cerium.

12. The catalyst according to claim 10, wherein the transition metal element represented by $M^1$ is iron, and the transition metal element represented by $M^2$ is cerium.

13. The catalyst according to claim 10, wherein a mass ratio of the second transition metal element represented by $M^2$ to the first transition metal element represented by $M^1$ (second transition metal element/first transition metal element) is 5/95 or more and 80/20 or less.

14. The catalyst according to claim 10, wherein the transition metal element represented by $M^1$ is at least one selected from the group consisting of iron, titanium, molybdenum, yttrium, chromium, lanthanum, and niobium.

15. The catalyst according to claim 10, wherein the metal element constituting the metal compound (B1) is at least one metal selected from the group consisting of beryllium, magnesium, calcium, strontium, barium, and zinc.

16. The catalyst according to claim 10, wherein the metal compound (B1) is a metal oxide.

17. A catalyst mixture comprising the catalyst according to claim 10 and an inactive buffering material.

18. The catalyst mixture according to claim 17, wherein the inactive buffering material is an inorganic oxide.

19. The catalyst mixture according to claim 17, wherein the inactive buffer material is at least one selected from the group consisting of an oxide containing a group 4 element and an oxide containing a group 14 element.

20. A carbon dioxide reducing method for reducing carbon dioxide using the catalyst mixture according to claim 17, wherein
a catalyst reduction reaction to reduce the catalyst and a carbon dioxide reduction reaction to reduce carbon dioxide by the catalyst are carried out.

21. An apparatus for reducing carbon dioxide, comprising the catalyst mixture according to claim 17.

22. A catalyst comprising:
a first transition metal oxide (A1) represented by the general formula $M^1O_x$, wherein $M^1$ represents a transition metal element, and x represents a positive real number;
a metal compound (B1) capable of adsorbing carbon dioxide; and
a platinum-based compound (C1), wherein
the first transition metal oxide (A1) is supported on the metal compound (B1), and
the first transition metal oxide (A1) is capable of generating a compound represented by the general formula $M^1O_{x-n}$ by reduction, wherein $M^1$ and x are as defined above, and n represents a positive real number equal to or less than x.

23. The catalyst according to claim 22, wherein the transition metal element represented by $M^1$ is at least one selected from the group consisting of iron, titanium, molybdenum, yttrium, chromium, lanthanum, and niobium.

24. The catalyst according to claim 22, wherein the metal element constituting the metal compound (B1) is at least one metal selected from the group consisting of beryllium, magnesium, calcium, strontium, barium, and zinc.

25. The catalyst according to claim 22, wherein the metal compound (B1) is a metal oxide.

26. A catalyst mixture comprising the catalyst according to claim 22 and an inactive buffering material.

27. The catalyst mixture according to claim 26, wherein the inactive buffering material is an inorganic oxide.

28. The catalyst mixture according to claim 26, wherein the inactive buffer material is at least one selected from the group consisting of an oxide containing a group 4 element and an oxide containing a group 14 element.

29. A carbon dioxide reducing method for reducing carbon dioxide using the catalyst mixture according to claim 26, wherein
a catalyst reduction reaction to reduce the catalyst and a carbon dioxide reduction reaction to reduce carbon dioxide by the catalyst are carried out.

30. An apparatus for reducing carbon dioxide, comprising the catalyst mixture according to claim 26.

31. A carbon dioxide reducing method for reducing carbon dioxide using a catalyst,
wherein a catalyst reduction reaction to reduce the catalyst and a carbon dioxide reduction reaction to reduce carbon dioxide by the catalyst are carried out, and
wherein the catalyst comprises:
a first transition metal oxide (A1) represented by the general formula $M^1O_x$, wherein $M^1$ represents a transition metal element, and x represents a positive real number; and
a metal compound (B1) capable of adsorbing carbon dioxide, wherein
the first transition metal oxide (A1) is supported on the metal compound (B1), and
the first transition metal oxide (A1) is capable of generating a compound represented by the general formula $M^1O_{x-n}$ by reduction, wherein $M^1$ and x are as defined above, and n represents a positive real number equal to or less than x.

32. The carbon dioxide reducing method according to claim 31, wherein a reaction temperature in the carbon dioxide reduction reaction is equal to or higher than an equilibrium reaction onset temperature of the metal compound (B1).

33. The carbon dioxide reducing method according to claim 32, wherein the reaction temperature in the carbon dioxide reduction reaction is 700° C. or less.

34. The carbon dioxide reducing method according to claim 31, wherein the transition metal element represented by $M^1$ is at least one selected from the group consisting of iron, titanium, molybdenum, yttrium, chromium, lanthanum, and niobium.

35. The carbon dioxide reducing method according to claim 31, wherein the metal element constituting the metal compound (B1) is at least one metal selected from the group consisting of beryllium, magnesium, calcium, strontium, barium, and zinc.

36. The carbon dioxide reducing method according to claim 31, wherein the metal compound (B1) is a metal oxide.

37. The carbon dioxide reducing method according to claim 31, wherein the catalyst is a catalyst mixture comprising the catalyst and an inactive buffering material.

38. The carbon dioxide reducing method according to claim 37, wherein the inactive buffering material is an inorganic oxide.

39. The carbon dioxide reducing method according to claim 37, wherein the inactive buffer material is at least one selected from the group consisting of an oxide containing a group 4 element and an oxide containing a group 14 element.

40. An apparatus for reducing carbon dioxide, comprising a first reactor containing a catalyst, a carbon dioxide supplier, a hydrogen supplier, and a switching system,
wherein the first reactor is coupled by the switching system alternately to the carbon dioxide supplier or to the hydrogen supplier, and
wherein the catalyst comprises:
a first transition metal oxide (A1) represented by the general formula $M^1O_x$, wherein $M^1$ represents a transition metal element, and x represents a positive real number; and
a metal compound (B1) capable of adsorbing carbon dioxide, wherein
the first transition metal oxide (A1) is supported on the metal compound (B1), and
the first transition metal oxide (A1) is capable of generating a compound represented by the general formula $M^1O_{x-n}$ by reduction, wherein $M^1$ and x are as defined above, and n represents a positive real number equal to or less than x.

41. The apparatus for reducing carbon dioxide according to claim 40, further comprising a second reactor comprising the catalyst, wherein the first reactor and the second reactor are coupled by the switching system alternately to the carbon dioxide supplier or to the hydrogen supplier.

42. The apparatus for reducing carbon dioxide according to claim 40, wherein the transition metal element represented by $M^1$ is at least one selected from the group consisting of iron, titanium, molybdenum, yttrium, chromium, lanthanum, and niobium.

43. The apparatus for reducing carbon dioxide according to claim 40, wherein the metal element constituting the metal compound (B1) is at least one metal selected from the group consisting of beryllium, magnesium, calcium, strontium, barium, and zinc.

44. The apparatus for reducing carbon dioxide according to claim 40, wherein the metal compound (B1) is a metal oxide.

45. The apparatus for reducing carbon dioxide according to claim 40, wherein the catalyst is a catalyst mixture comprising the catalyst and an inactive buffering material.

46. The apparatus for reducing carbon dioxide according to claim 40, wherein the inactive buffering material is an inorganic oxide.

47. The apparatus for reducing carbon dioxide according to claim 40, wherein the inactive buffer material is at least one selected from the group consisting of an oxide containing a group 4 element and an oxide containing a group 14 element.

* * * * *